(12) United States Patent
Yamanaka et al.

(10) Patent No.: US 8,798,839 B2
(45) Date of Patent: Aug. 5, 2014

(54) HYBRID VEHICLE CONTROL DEVICE

(75) Inventors: Fumihiro Yamanaka, Hiratsuka (JP); Masami Suzuki, Mishima (JP)

(73) Assignees: Nissan Motor Co., Ltd., Yokohama (JP); JATCO Ltd., Fuji-shi (JP)

(*) Notice: Subject to any disclaimer, the term of this patent is extended or adjusted under 35 U.S.C. 154(b) by 0 days.

(21) Appl. No.: 13/980,850

(22) PCT Filed: Jan. 27, 2012

(86) PCT No.: PCT/JP2012/051769
§ 371 (c)(1),
(2), (4) Date: Jul. 19, 2013

(87) PCT Pub. No.: WO2012/102370
PCT Pub. Date: Aug. 2, 2012

(65) Prior Publication Data
US 2013/0297136 A1 Nov. 7, 2013

(30) Foreign Application Priority Data
Jan. 28, 2011 (JP) .................................. 2011-016797

(51) Int. Cl.
*B60W 20/00* (2006.01)

(52) U.S. Cl.
USPC ................... 701/22; 701/36; 701/51; 701/54; 701/66; 701/67; 701/99; 701/101; 701/113; 903/902; 475/1

(58) Field of Classification Search
None
See application file for complete search history.

(56) References Cited

U.S. PATENT DOCUMENTS

| | | | |
|---|---|---|---|
| 6,077,186 A * | 6/2000 | Kojima et al. | 477/3 |
| 6,519,521 B2 * | 2/2003 | Takatori et al. | 701/55 |
| 8,579,759 B2 * | 11/2013 | Akebono et al. | 477/5 |
| 8,636,620 B2 * | 1/2014 | Nagashima et al. | 477/5 |
| 8,672,805 B2 * | 3/2014 | Akebono et al. | 477/8 |
| 2002/0035006 A1 * | 3/2002 | Suzuki et al. | 477/3 |
| 2004/0127313 A1 * | 7/2004 | Shimanaka et al. | 474/18 |
| 2004/0157704 A1 * | 8/2004 | Stork et al. | 477/166 |
| 2005/0102082 A1 * | 5/2005 | Joe et al. | 701/54 |
| 2008/0011529 A1 * | 1/2008 | Hoher et al. | 180/65.2 |
| 2008/0017427 A1 * | 1/2008 | Nakanowatari | 180/65.2 |
| 2009/0312132 A1 * | 12/2009 | Saitou et al. | 475/128 |
| 2010/0250074 A1 * | 9/2010 | Hirasako et al. | 701/55 |
| 2010/0273604 A1 * | 10/2010 | Imaseki | 477/5 |
| 2011/0082630 A1 * | 4/2011 | Kawaguchi et al. | 701/58 |
| 2011/0256978 A1 * | 10/2011 | Falkenstein | 477/5 |
| 2012/0108385 A1 * | 5/2012 | Sano et al. | 477/5 |
| 2012/0202646 A1 * | 8/2012 | Suzuki et al. | 477/5 |
| 2012/0203406 A1 * | 8/2012 | Akebono et al. | 701/22 |

(Continued)

FOREIGN PATENT DOCUMENTS

JP 2007-261498 A 10/2007
JP 2008-179242 A 8/2008

*Primary Examiner* — Jonathan M Dager
(74) *Attorney, Agent, or Firm* — Global IP Counselors, LLP

(57) ABSTRACT

A hybrid vehicle control device is provided with an engine, a motor/generator, a first clutch, an automatic transmission, a second clutch, and a controller having a simultaneous process selection control section. The simultaneous process selection control section performs engine startup control and downshift control in parallel in cases where the torque outputtable by the motor subsequent to downshifting during overlap of an engine startup request and a downshift request is equal to or greater than the engine startup torque, or performs engine startup control first then downshift control in cases where the torque outputtable by the motor subsequent to downshifting is less than the engine startup torque.

6 Claims, 9 Drawing Sheets

(56) References Cited

U.S. PATENT DOCUMENTS

| | | | |
|---|---|---|---|
| 2013/0124027 A1* | 5/2013 | Tanishima et al. | 701/22 |
| 2013/0218391 A1* | 8/2013 | Aizawa et al. | 701/22 |
| 2013/0218392 A1* | 8/2013 | Aizawa et al. | 701/22 |
| 2013/0297136 A1* | 11/2013 | Yamanaka et al. | 701/22 |

* cited by examiner

|  | B1 Fr/B | C1 I/C | C2 D/C | C3 H&LR/C | B2 LOW/B | B3 2346/B | B4 R/B | F1 1st OWC | F2 1&2 OWC |
|---|---|---|---|---|---|---|---|---|---|
| 1st | (O) |  |  | (O) | O |  |  | O | O |
| 2nd |  |  |  | (O) | O | O |  |  | O |
| 3rd |  |  | O |  | O | O |  |  |  |
| 4th |  |  | O | O |  | O |  |  |  |
| 5th |  | O | O | O |  |  |  |  |  |
| 6th |  | O |  | O |  | O |  |  |  |
| 7th | O | O |  | O |  |  |  | O |  |
| Rev. | O |  |  | O |  |  | O |  |  |

HYBRID VEHICLE CONTROL DEVICE

CROSS-REFERENCE TO RELATED APPLICATIONS

This application is a U.S. National stage application of International Application No. PCT/JP2012/051769, filed Jan. 27, 2012, which claims priority claims priority under to Japanese Patent Application No. 2011-016796, filed in Japan on Jan. 28, 2011, the entire contents of which is hereby incorporated by reference.

BACKGROUND

1. Field of the Invention

The present invention relates to a control device for a hybrid vehicle whereby engine startup control and downshifting control of an automatic transmission are processed simultaneously while the vehicle is traveling.

2. Background Information

In one conventional example of a hybrid vehicle, an engine, a first clutch, a motor/generator, an automatic transmission (second clutch), and drive wheels are sequentially aligned from upstream to downstream in the drive system, and a selection can be made between an EV travel mode and an HEV travel mode. It is disclosed that in this hybrid vehicle, when the timings of a shift request and an engine startup request overlap while the vehicle is traveling, engine startup control and shifting control are processed simultaneously so that the travel mode is switched smoothly or the shift position is switched smoothly (see Japanese Laid-Open Patent Publication No. 2007-261498, for example).

SUMMARY

However, in a conventional hybrid vehicle control device, during simultaneous processing of engine startup control and downshift control, engine startup control (cranking) is performed first, with downshift control being carried out after a first clutch synchronization determination. That is, as engine startup control proceeds, downshift control is suspended from proceeding, and termination of engine startup control is awaited before downshift control proceeds. For this reason, when the release capacity in downshift control is low for example, drive force cannot be transmitted to a sufficient extent during cranking, which is performed during suspension of downshift control, and this causes the driver to feel lag. Thus, a problem encountered when simultaneously processing engine startup control and downshift control was that once a single simultaneous processing pattern has been decided, there are scenarios in which shock performance is unsatisfactory, and scenarios in which lag performance is unsatisfactory.

With the foregoing in view, it is an object of the present invention to offer a hybrid vehicle control device whereby, during simultaneous processing of engine startup control and downshift control while driving, satisfactory shock performance and lag performance can be achieved in any scenario.

In order to achieve the aforementioned object, the hybrid vehicle control device of the present invention is provided with an engine, a motor, a first clutch, an automatic transmission, a second clutch, and a controller that includes a first simultaneous process control section, a second simultaneous process control section and a simultaneous process selection control. The motor is provided to a drive system leading from the engine to drive wheels, and has an engine startup motor function in addition to a drive motor function. The first clutch is interposed between the engine and the motor, and switches to hybrid vehicle drive mode through application, or to electric car driving mode through release. The automatic transmission is interposed between the motor and the drive wheels, and automatically modifies the gear ratio. The second clutch is interposed at any position from the motor to the drive wheels, and maintains a slip application state during engine startup control that includes during cranking. The first simultaneous process control section is programmed such that during a simultaneous processing of the engine startup control initiated on based a startup request and a downshift control of the automatic transmission initiated based on a shift request while traveling, the engine startup control is first executed, and then the downshift control is executed once the engine startup control is completed. The second simultaneous process control section is programmed such that during simultaneous processing of the engine startup control initiated based on a startup request and the downshift control of the automatic transmission initiated based on a shift request while traveling, the engine startup control and the downshift control are executed in parallel, and prior to completion of startup of the engine, completes downshifting by engaging the engaged element that is engaged for the downshifting, the automatic transmission is placed into a state of transmitting drive force in a shift position occurring after the down shifting. The simultaneous process selection control section is programmed such that before simultaneously processing the engine startup control and the downshift control, in cases where torque outputtable by the motor after downshifting is less than a predetermined torque for starting up the engine, selects the first simultaneous process control, and cases where the torque outputtable by the motor subsequent to downshifting is equal to or greater than the predetermined torque for starting up the engine, the simultaneous process selection control section selects the second simultaneous process control, whereupon simultaneous processing of the engine startup control and the downshift control is executed by the simultaneous process control section accordingly.

Therefore, when engine startup control and downshift control are simultaneously processed during driving, different simultaneous process control is performed on the basis of a scenario determination, made prior to initiating simultaneous processing, as to whether sufficient motor torque for cranking can be assured. Specifically, by performing downshift control and cranking for engine startup in parallel in scenarios in which sufficient motor torque for cranking can be ensured, delayed acceleration (lag) can be minimized. On the other hand, by prohibiting downshift control during cranking by the motor in scenarios in which sufficient motor torque for cranking cannot be assured, and performing downshift control only after cranking is completed, the occurrence of shock due to insufficient cranking torque during engine startup can be prevented. As a result, during simultaneous processing of engine startup control and downshift control during driving, satisfactory shock performance and lag performance can be achieved in any scenario.

PREFERRED EMBODIMENTS OF THE INVENTION

Figure 1:
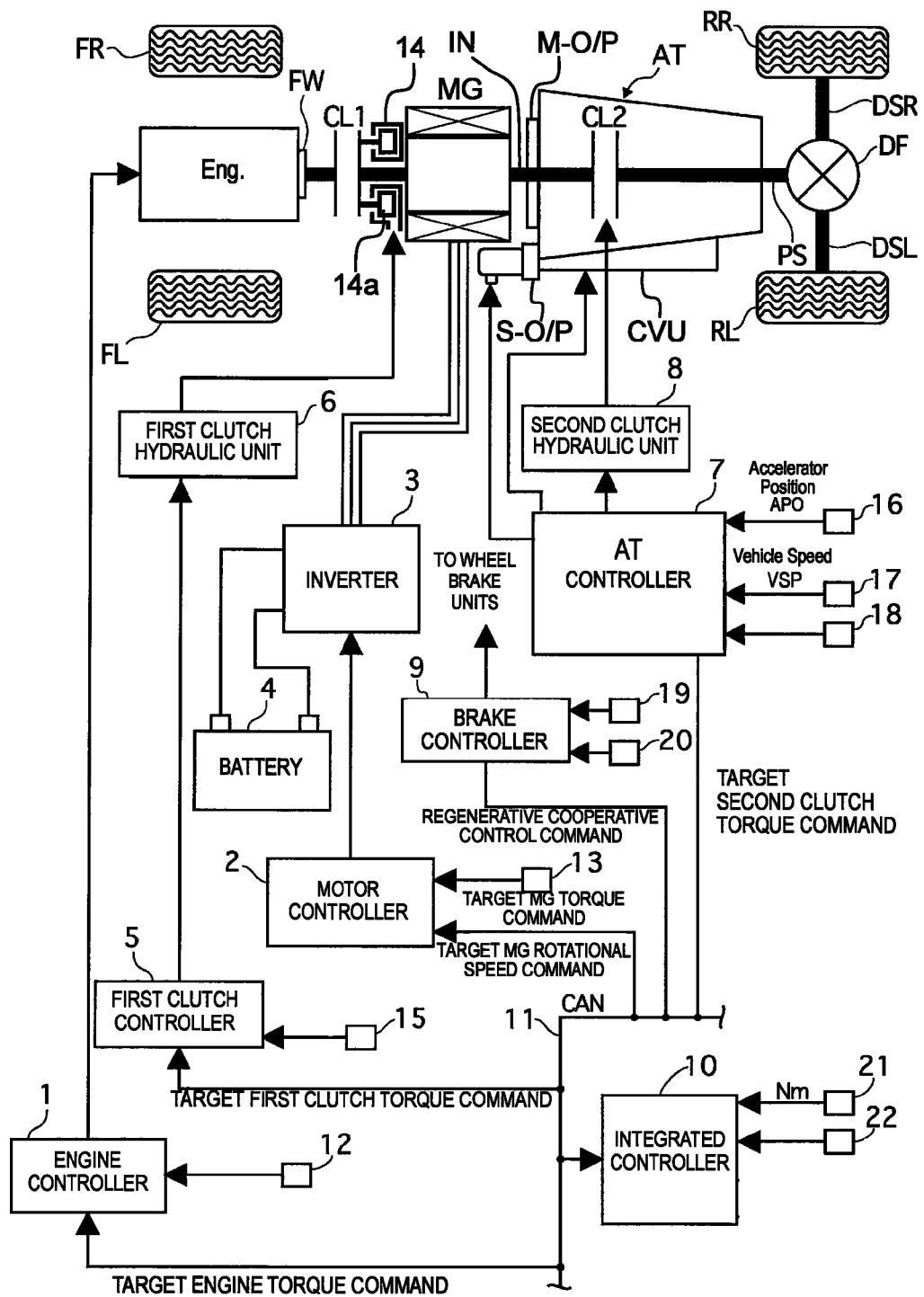
FIG. 1 is an overall system diagram showing a rear-wheel drive FR hybrid vehicle (one example of a hybrid vehicle) to which the control device of Embodiment 1 is applied.

A hybrid vehicle control device of the present invention is described below based on Embodiment 1 shown in the drawings.

Embodiment 1

First, the configuration is described. FIG. 1 shows a rear-wheel drive FR hybrid vehicle (one example of a hybrid vehicle) to which the control device of Embodiment 1 is applied. The overall system configuration is described below based on FIG. 1.

The drive system of the FR hybrid vehicle in Embodiment 1 has an engine Eng, a first clutch CL1, a motor/generator MG (a motor), a second clutch CL2, an automatic transmission AT, a transmission input shaft IN, a mechanical oil pump M-O/P, a sub-oil pump S-O/P, a propeller shaft PS, a differential DF, a left drive shaft DSL, a right drive shaft DSR, a left rear wheel RL (a drive wheel), and a right rear wheel RR (a drive wheel), as shown in FIG. 1. FL indicates a left front wheel and FR indicates a right front wheel.

The engine Eng is a gasoline engine or a diesel engine, and engine startup control, engine stop control, valve opening degree control of a throttle valve, fuel cutting control, and the like are performed based on engine control commands from an engine controller 1. A flywheel FW is provided to the engine output shaft.

The first clutch CL1 is a clutch installed between the engine Eng and the motor/generator MG, and the engaging, semi-engaging, and disengaging thereof are controlled by first clutch control oil pressure generated by a first clutch hydraulic unit 6 on the basis of a first clutch control command from a first clutch controller 5. A normally closed dry single-plate clutch is used as the first clutch CL1, wherein a full engagement is held by the urging force of a diaphragm spring, and full engaging to full disengaging is controlled by stroke control using a hydraulic actuator 14 having a piston 14a, for example.

The motor/generator MG is a synchronous motor/generator in which a permanent magnet is embedded in a rotor and a stator coil is wound around a stator, and the motor/generator MG is controlled by the application of a three-phase alternating current generated by an inverter 3 on the basis of a control command from a motor controller 2. This motor/generator MG can also operate as an electric motor rotatably driven by the supply of power from a battery 4 (this operating state is referred to below as "powered"), and can also function as a power generator for generating electromotive force at both ends of the stator coil and can charge the battery 4 when the rotor receives rotational energy from the engine Eng or the drive wheels (this operating state is referred to below as "regenerating"). The rotor of the motor/generator MG is linked to the transmission input shaft IN of the automatic transmission AT.

The second clutch CL2 is a clutch installed between the motor/generator MG and the left and right rear wheels RL, RR, and the engaging, slip engaging, and disengaging thereof are controlled by control oil pressure generated by a second clutch hydraulic unit 8 on the basis of a second clutch control command from an AT controller 7. A normally-open wet multi-plate clutch or wet multi-plate brake is used as the second clutch CL2, wherein the oil flow rate and oil pressure can be continuously controlled by a proportional solenoid, for example. The first clutch hydraulic unit 6 and the second clutch hydraulic unit 8 are housed within an AT hydraulic control valve unit CVU appended to the automatic transmission AT.

The automatic transmission AT is a multi-step transmission which automatically switches a stepwise shift position in response to the vehicle speed, the accelerator position, or the like. In Embodiment 1, the automatic transmission AT is a multi-step transmission having seven forward speeds and one reverse speed. In Embodiment 1, the second clutch CL2 is not a newly added specialized clutch independent of the automatic transmission AT, but a friction element (a clutch or a brake) that complies with predetermined conditions is selected from a plurality of friction elements engaged in the different shift positions of the automatic transmission AT.

The transmission input shaft IN (=motor shaft) of the automatic transmission AT is provided with the mechanical oil pump M-O/P, which is driven by the transmission input shaft IN. When the discharge pressure from the mechanical oil pump M-O/P is insufficient at times such as when the vehicle has stopped, the sub-oil pump S-O/P, which is driven by an electric motor in order to suppress oil pressure loss, is provided to a motor housing or the like. Drive control of the sub-oil pump S-O/P is performed by the AT controller 7, described hereinafter.

The propeller shaft PS is linked to the transmission output shaft of the automatic transmission AT. The propeller shaft PS is linked to the left and right rear wheels RL, RR via the differential DF, the left drive shaft DSL, and the right drive shaft DSR.

As travel modes according to differences in the forms of driving, the FR hybrid vehicle has an electric automobile travel mode ("EV travel mode" below), a hybrid vehicle travel mode ("HEV travel mode" below), and a drive torque control travel mode ("WSC travel mode" below).

The "EV travel mode" is a mode in which the first clutch CL1 is disengaged and the vehicle travels only by the drive force of the motor/generator MG, and the EV travel mode includes a motor travel mode and a regenerating travel mode. This "EV travel mode" is selected when the required drive force is low and a battery SOC is ensured.

The "HEV travel mode" is a mode in which the vehicle travels with the first clutch CL1 engaged, including a motor assist travel mode, a power generating travel mode, and an engine travel mode. The vehicle travels in any of these modes. The "HEV travel mode" is selected when the required drive force is high or when the battery SOC is insufficient.

The "WSC travel mode" is a mode in which the vehicle travels while the second clutch CL2 is maintained in a slip-engaged state by the speed control of the motor/generator MG and the clutch torque capacity is controlled. The clutch torque capacity of the second clutch CL2 is controlled so that the drive torque transmitted past the second clutch CL2 will meet the drive torque as required by the accelerator depression by the driver. This "WSC travel mode" is selected in a travel area in which the engine speed falls below the idling speed, such as when "HEV travel mode" has been selected and the vehicle stops, starts to move, or decelerates.

Next, the control system of the FR hybrid vehicle is described. The control system of the FR hybrid vehicle in Embodiment 1 is configured including the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10, as shown in FIG. 1. The controllers 1, 2, 5, 7, 9 and the integrated controller 10 are connected via a CAN communication line 11 that enables the controllers to exchange information with each other.

The engine controller 1 inputs engine speed information from an engine speed sensor 12, a target engine torque command from the integrated controller 10, and other necessary information. Commands for controlling engine operating points (Ne, Te) are outputted to a throttle valve actuator or the like of the engine Eng.

The motor controller 2 inputs information from a resolver 13 for detecting the rotor rotational position of the motor/generator MG, a target MG torque command and a target MG speed command from the integrated controller 10, and other necessary information. Commands for controlling motor operating points (Nm, Tm) of the motor/generator MG are outputted to the inverter 3. This motor controller 2 observes the battery SOC that expresses the charging capacity of the battery 4, and supplies this battery SOC information to the integrated controller 10 via the CAN communication line 11.

The first clutch controller 5 inputs sensor information from a first clutch stroke sensor 15 for detecting the stroke position of the piston 14a of the hydraulic actuator 14, a target CL1 torque command from the integrated controller 10, and other necessary information. Commands for controlling the engaging, semi-engaging, and disengaging of the first clutch CL1 are outputted to the first clutch hydraulic unit 6 in the AT hydraulic control valve unit CVU.

Figure 2:
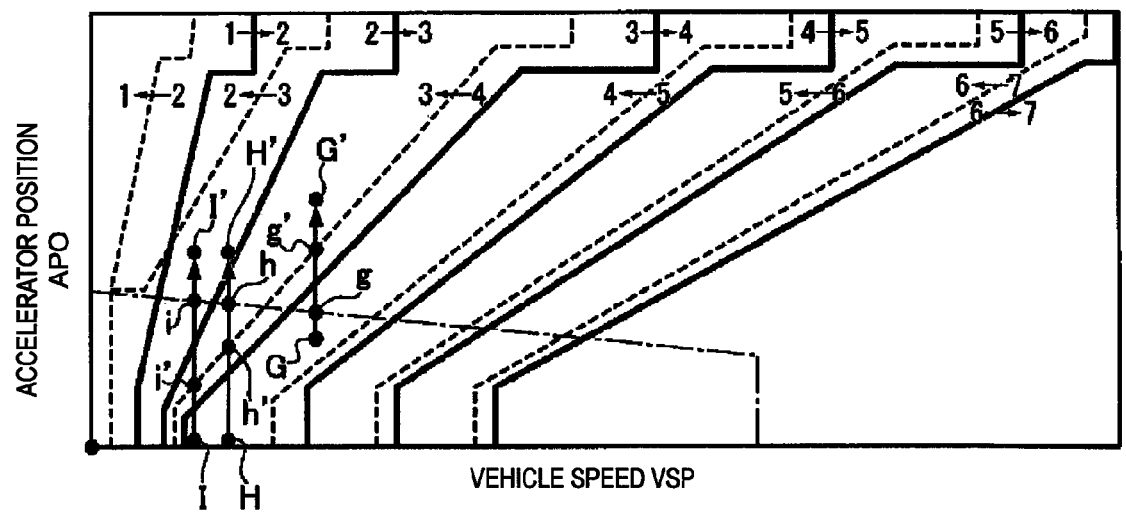
FIG. 2 is a diagram showing an example of an automatic transmission AT shift map designed for the AT controller 7 of Embodiment 1.

The AT controller 7 inputs information from sensors such as an accelerator position sensor 16, a vehicle speed sensor 17, and other sensors 18. During travel in which a D range is selected, driving points are determined according to the accelerator position APO and the vehicle speed VSP, the positions of these driving points on the shift map shown in FIG. 2 are used to find optimal shift positions, and control commands for achieving the found shift positions are outputted to the AT hydraulic control valve unit CVU. In this shift map, up shifting curves and downshifting curves are drawn according to the accelerator position APO and the vehicle speed VSP, as shown in FIG. 2, for example. In addition to this shifting control, when a target CL2 torque command is inputted from the integrated controller 10, second clutch control is performed for outputting a command for controlling the slip engagement of the second clutch CL2 to the second clutch hydraulic unit 8 in the AT hydraulic control valve unit CVU. When the downshifting request timing from the AT controller 7 and the engine startup request timing from the integrated controller 10 overlap in a deviation-allowing range, engine startup control and downshifting control are processed simultaneously according to predetermined program specifics.

The brake controller 9 inputs sensor information from a vehicle wheel speed sensor 19 for detecting the vehicle wheel speeds of the four wheels and a brake stroke sensor 20, a regeneration cooperative control command from the integrated controller 10, and other necessary information. When the brake is depressed, for example, and when regenerative braking force is given priority but is insufficient alone for the braking force required by the brake stroke BS, regeneration cooperative control is performed so as to compensate for this insufficiency with mechanical braking force (liquid-pressure braking force).

The integrated controller 10 has the function of managing the energy consumed by the entire vehicle and enabling the vehicle to travel at maximum efficiency, and the integrated controller 10 inputs necessary information from a motor speed sensor 21 for detecting the motor speed Nm and from other sensors and switches 22, and also information via the CAN communication line 11. The integrated controller 10 also outputs a target engine torque command to the engine controller 1, a target MG torque command and a target MG speed command to the motor controller 2, a target CL1 torque command to the first clutch controller 5, a target CL2 torque command to the AT controller 7, and a regeneration cooperative control command to the brake controller 9.

Figure 3:
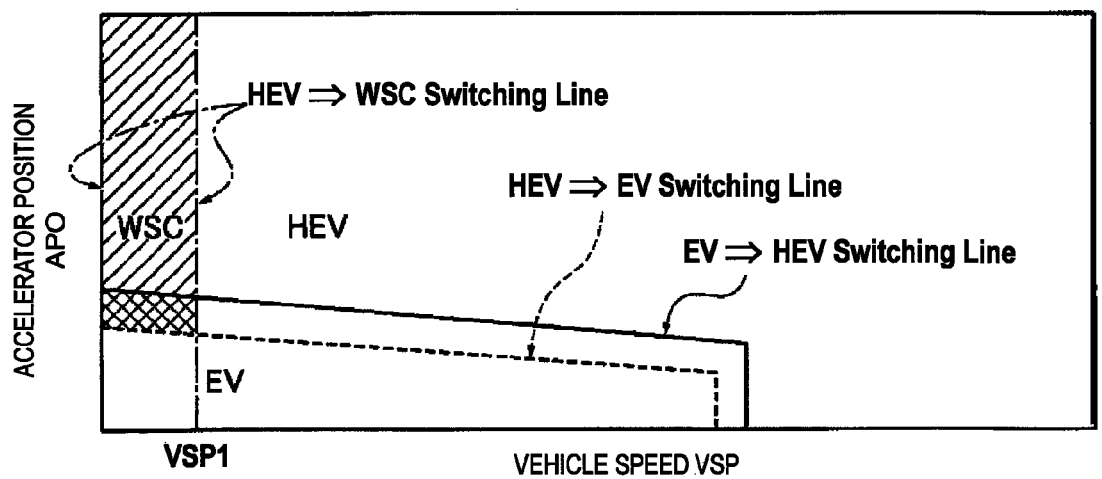
FIG. 3 is a diagram showing an example of an EV-HEV selection map designed for the mode selector of the integrated controller 10 of Embodiment 1.

The integrated controller 10 has a mode selector for retrieving the optimal travel mode according to positions of driving points determined by the accelerator position APO and the vehicle speed VSP, as shown on the EV-HEV selection map of FIG. 3; and for selecting the retrieved travel mode as the target travel mode. The EV-HEV selection map includes: an EV→HEV switching line, where "EV travel mode" switches to "HEV travel mode" when the driving point (APO, VSP) in the EV area crosses the line; an HEV→EV switching line, where "HEV travel mode" switches to "EV travel mode" when the driving point (APO, VSP) in the HEV area crosses the line; and an HEV→WSC switching line, where the mode switches to "WSC travel mode" when "HEV travel mode" has been selected and the driving point (APO, VSP) enters the WSC area. The EV→HEV switching line and the HEV→EV switching line are set with a hysteresis quantity as a line dividing the EV area and the HEV area. The HEV→WSC switching line is set to a first set vehicle speed VSP1 at which the engine Eng maintains idling speed when the automatic transmission AT has selected the first speed. When "EV travel mode" has been selected and the battery SOC falls to a predetermined value or below, "HEV travel mode" is forcefully implemented as the target travel mode.

In the integrated controller 10, when "EV travel mode" has been selected and the mode selector then selects "HEV travel mode" as the target travel mode, the transition to "HEV travel mode" is made through engine startup control. The engine startup control puts the first clutch CL1, which had been disengaged in "EV travel mode," into a semi-engaged state, cranks the engine Eng with the motor/generator MG as a starter motor, and starts up the engine Eng by supplying fuel or by ignition. The first clutch CL1 is engaged after rotation synchronization is complete. During this engine startup control execution, the motor/generator MG is changed from torque control to speed control, and differential rotation is created, causing the second clutch CL2 to be slip-engaged. In other words, torque fluctuations that accompany the engine startup control are absorbed by the second clutch CL2, and engine startup shock is prevented, which is caused by the transmission of fluctuating torque to the left and right rear wheels RL, RR.

When "HEV travel mode" has been selected and the mode selector then selects "EV travel mode" as the target travel mode, the transition to "EV travel mode" is made through engine startup control. In this engine startup control, after the first clutch CL1, which had been engaged in "HEV travel mode," is disengaged, the cutoff engine Eng is stopped. When this engine stop control is being executed, similar to the engine startup control, the motor/generator MG is changed from torque control to speed control, and differential rotation is created, causing the second clutch CL2 to be slip-engaged. In other words, torque fluctuations that accompany the engine stop control are absorbed by the second clutch CL2, and engine startup shock is prevented, which is caused by the transmission of fluctuating torque to the left and right rear wheels RL, RR.

Figures 4, 5:
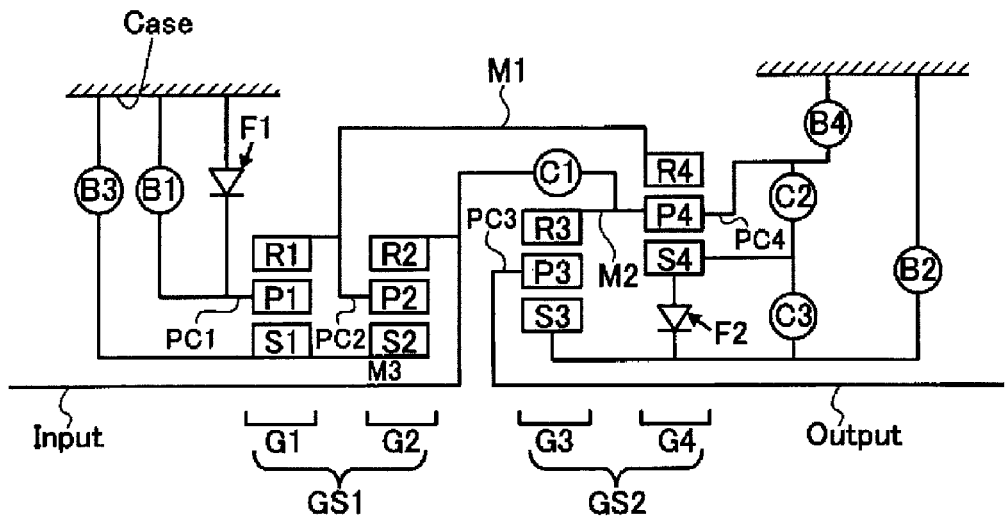
FIG. 4 is a skeleton diagram showing an example of an automatic transmission AT installed in a FR hybrid vehicle to which the control device of Embodiment 1 is applied.
FIG. 5 is an engagement action table showing the engaged states of the friction elements at each shift position of the automatic transmission AT installed in the FR hybrid vehicle to which the control device of Embodiment 1 is applied.

FIG. 4 shows an example of an automatic transmission AT installed in a FR hybrid vehicle to which the control device of Embodiment 1 is applied. The configuration of the automatic transmission AT is described below based on FIG. 4.

The automatic transmission AT is a multi-speed automatic transmission having seven forward speeds and one reverse speed, wherein drive force from the engine Eng and/or the motor/generator MG is inputted from a transmission input shaft Input, the rotational speed is changed by a shifting gear mechanism having four planetary gears and seven friction elements, and the force is outputted from a transmission output shaft Output.

The shifting gear mechanism contains the following arranged sequentially along a shaft from the transmission input shaft Input to the transmission output shaft Output: a first planetary gear set GS1 comprising a first planetary gear G1 and a second planetary gear G2, and a second planetary gear set GS2 comprising a third planetary gear G3 and a fourth planetary gear G4. A first clutch C1, a second clutch C2, a third clutch C3, a first brake B1, a second brake B2, a third brake B3, and a fourth brake B4 are arranged as hydraulically actuated friction elements. A first one-way clutch F1 and a second one-way clutch F2 are arranged as mechanically actuated friction elements.

The first planetary gear G1 is a single pinion planetary gear having a first sun gear S1, a first ring gear R1, and a first carrier PC1 for supporting a first pinion P1 which meshes with the gears S1, R1. The second planetary gear G2 is a single pinion planetary gear having a second sun gear S2, a second ring gear R2, and a second carrier PC2 for supporting a second pinion P2 which meshes with the gears S2, R2.

The third planetary gear G3 is a single pinion planetary gear having a third sun gear S3, a third ring gear R3, and a third carrier PC3 for supporting a third pinion P3 that meshes with the gears S3, R3. The fourth planetary gear G4 is a single pinion planetary gear having a fourth sun gear S4, a fourth ring gear R4, and a fourth carrier PC4 for supporting a fourth pinion P4 that meshes with the gears S4, R4.

The transmission input shaft Input is linked to the second ring gear R2, and rotational drive force is inputted from the engine Eng and/or the motor/generator MG. The transmission output shaft Output is linked to the third carrier PC3, and output rotational drive force is transmitted to the drive wheel (the left and right rear wheels RL, RR) via a final gear or the like.

The first ring gear R1, the second carrier PC2, and the fourth ring gear R4 are integrally linked by a first linking member M1. The third ring gear R3 and the fourth carrier PC4 are integrally linked by a second linking member M2. The first sun gear S1 and the second sun gear S2 are integrally linked by a third linking member M3.

The first planetary gear set GS1 is configured having four rotating elements, by linking the first planetary gear G1 and the second planetary gear G2 through the first linking member M1 and the third linking member M3. The second planetary gear set GS2 is configured having five rotating elements, by linking the third planetary gear G3 and the fourth planetary gear G4 through the second linking member M2.

In the first planetary gear set GS1, torque is inputted from the transmission input shaft Input to the second ring gear R2, and the inputted torque is outputted to the second planetary gear set GS2 via the first linking member M1. In the second planetary gear set GS2, torque is inputted from the transmission input shaft Input to the second linking member M2 and inputted to the fourth ring gear R4 via the first linking member M1, and the inputted torque is outputted from the third carrier PC3 to the transmission output shaft Output.

The first clutch C1 (=input clutch I/C) is a clutch for selectively disconnecting the transmission input shaft Input and the second linking member M2. The second clutch C2 (=direct clutch D/C) is a clutch for selectively disconnecting the fourth sun gear S4 and the fourth carrier PC4. The third clutch C3 (=H&LR clutch H&LR/C) is a clutch for selectively disconnecting the third sun gear S3 and the fourth sun gear S4.

The second one-way clutch F2 (=1&2 speed one-way clutch 1&2 OWC) is disposed between the third sun gear S3 and the fourth sun gear S4. Thereby, when the third clutch C3 is disengaged and the rotational speed of the fourth sun gear S4 is greater than the third sun gear S3, the third sun gear S3 and the fourth sun gear S4 will have independent rotational speeds. Consequently, the third planetary gear G3 and the fourth planetary gear G4 are connected via the second linking member M2, and the respective planetary gears achieve independent gear ratios.

The first brake B1 (=front brake Fr/B) is a brake for selectively stopping the rotation of the first carrier PC1 relative to a transmission case Case. The first one-way clutch F1 (=one-speed one-way clutch 1stOWC) is arranged in parallel with the first brake B1. The second brake B2 (=low brake LOW/B) is a brake for selectively stopping the rotation of the third sun gear S3 relative to the transmission case Case. The third brake B3 (=2346 brake 2346/B) is a brake for selectively stopping the rotation of the third linking member M3, which links the first sun gear S1 and the second sun gear S2, relative to the transmission case Case. The fourth brake B4 (=reverse brake R/B) is a brake for selectively stopping the rotation of the fourth carrier PC4 relative to the transmission case Case.

FIG. 5 is an engaging action table showing the engaged states of the friction elements at each shift position of the automatic transmission AT installed in the FR hybrid vehicle to which the control device of Embodiment 1 is applied. In FIG. 5, the O symbols indicate that the corresponding friction element is hydraulically engaged during driving, the (O) symbols indicate that the corresponding friction element is hydraulically engaged during coasting (a one-way clutch actuation during driving), and the absence of a symbol indicates that the corresponding friction element is disengaged.

With the friction elements provided to the shifting gear mechanism configured as described above, shift positions including seven forward speeds and one reverse speed can be achieved as described below by performing a replacement shift of disengaging one friction element that had been engaged and engaging one friction element that had been disengaged. Specifically, in the "first speed," only the second brake B2 is engaged, and the first one-way clutch F1 and second one-way clutch F2 are thereby locked. In the "second speed," the second brake B2 and the third brake B3 are engaged, and the second one-way clutch F2 is locked. In the "third speed," the second brake B2, the third brake B3, and the second clutch C2 are engaged, and neither the first one-way clutch F1 nor the second one-way clutch F2 are locked. In the "fourth speed," the third brake B3, the second clutch C2, and the third clutch C3 are engaged. In the "fifth speed," the first clutch C1, the second clutch C2, and the third clutch C3 are engaged. In the "sixth speed," the third brake B3, the first clutch C1, and the third clutch C3 are engaged. In the "seventh speed," the first brake B1, the first clutch C1, and the third clutch C3 are engaged, and the first one-way clutch F1 is locked. In the "reverse speed," the fourth brake B4, the first brake B1, and the third clutch C3 are engaged.

Figure 6:
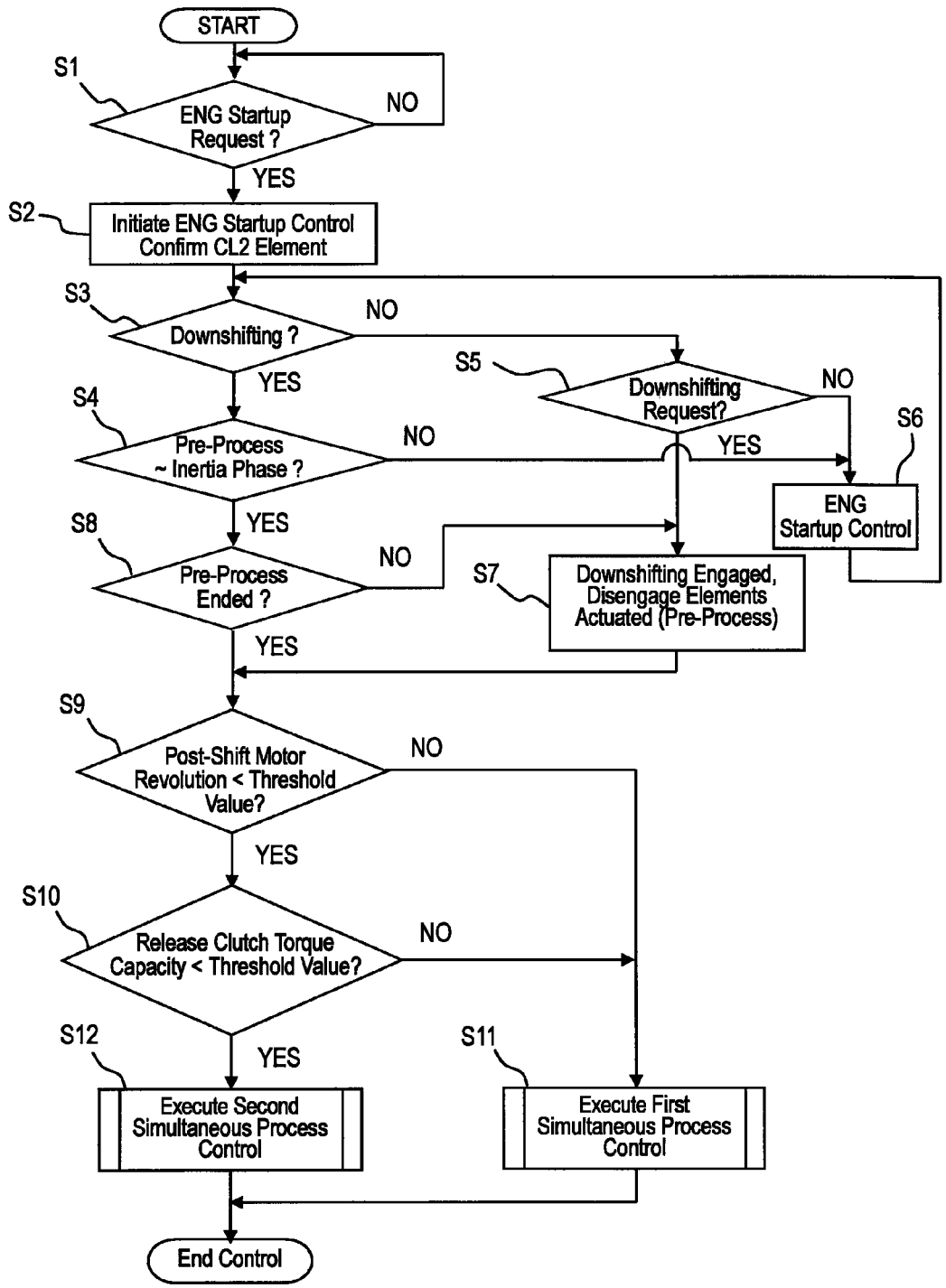
FIG. 6 is a flowchart showing the configuration and flow of the simultaneous processing of engine startup control and downshifting control performed by the integrated controller 10 of Embodiment 1.

FIG. 6 shows the configuration of the simultaneous processing of engine startup control and downshifting control performed by the integrated controller 10 of Embodiment 1 (startup/shifting simultaneous processing means). The steps of FIG. 6 are described below.

In step S1, a determination is made as to whether or not during travel with "EV travel mode" selected, there is an engine startup request outputted based on an "HEV travel mode" selection that the travel mode be switched to "HEV travel mode." When the determination is YES (there is an engine startup request), the flow advances to step S2, and when the determination is NO (there is not an engine startup request), the determination of step S1 is repeated.

In step S2, continuing from the determination that there is an engine startup request in step S1, engine startup control is initiated, the second clutch CL2 as the friction element is confirmed, and the flow advances to step S3. One of the friction elements engaged in the various shift positions can be selected as the second clutch CL2 slip-controlled in the engine startup control area, but the second clutch CL2 is defined as the element that is engaged at the shift position at least after downshifting. More specifically, the friction element selected is an element that is engaged or that remains engaged without disengaging even when engine startup control and shifting control are simultaneously processed, and the selected element is the second clutch CL2. When the current shift position is the "first speed," for example, the element selected is the second brake B2 which remains engaged even when the speed is up shifted to the "second speed." When the current shift position is the "second speed," the element selected is the second brake B2 which remains engaged even when the speed is downshifted to the "first speed" or up shifted to the "second speed." By the same reasoning, the third brake B3 is selected when the current shift position is the "third speed," the second clutch C2 is selected when the current shift position is the "fourth speed," the third clutch C3 is selected when the current shift position is the "fifth speed," and the first clutch C1 or the third clutch C3 is selected when the current shift position is the "sixth speed" or "seventh speed."

In step S3, continuing either from the engine startup control initiation and the CL1, CL2 element actuation in step S2, or from the engine startup control in step S6, a determination is made as to whether or not downshifting is taking place in the automatic transmission AT. When the determination is YES (downshifting is taking place), the flow advances to step S4, and when the determination is NO (downshifting is not taking place), the flow advances to step S5.

In step S4, continuing from the determination that downshifting is taking place in step S3, a determination is made as whether or not downshifting progress is during a pre-process (stroke phase)-inertia phase. When the determination is YES (downshifting up to the inertia phase is taking place), the flow advances to step S8, and when the determination is NO (downshifting progresses beyond the inertia phase), the flow advances to step S6.

In step S5, continuing from the determination that downshifting is not taking place in step S3, a determination is made as whether or not there is a downshifting request outputted due to the driving point (APO, VSP) crossing the downshifting line during travel. When the determination is YES (there is a downshifting request), the flow advances to step S7, and when the determination is NO (there is no downshifting request), the flow advances to step S6.

In step S6, continuing either from the determination that downshifting is progressing beyond a finish phase in step S4, or from the determination that there is no downshifting request in step S5, engine startup control for starting up the engine Eng is performed while the slip-engaged state of the second clutch CL2 is maintained, and the flow returns to step S3.

In step S7, continuing either from the determination that there is a downshifting request in step S5, or from the determination that the pre-process in step S8 has not yet ended, actuation of the downshifting engaged elements and disengaged elements (pre-process actuation) is executed, and the flow advances to step S9. The pre-process of the downshifting engaged elements is a process of causing the piston to travel a slight stroke through application of initial pressure against a return spring force so as to fill in the gap between plates, and creating the conditions immediately before the torque capacity through clutch engagement is manifested. The pre-process of the downshifting disengaged elements is the process of reducing the torque capacity of the engaged elements engaged by line pressure to the starting range of the inertia phase. For example, in the case of downshifting from speed 4 to 3, the engaged element is the second brake B2 (=low brake LOW/B), and the disengaged element is the third clutch C3 (=H&LR clutch H&LR/C). When the pre-process ends, control of the motor/generator MG is switched from torque control to speed control.

In step S8, continuing from the determination that downshifting is during the pre-process-inertia phase in step S4, a determination is made as whether or not the downshifting pre-process has ended. When the determination is YES (pre-process has ended), the flow advances to step S9, and when the determination is NO (pre-process has not ended), the flow advances to step S7.

In Step S9, following a determination in Step S7 to execute preprocessing, or in Step S8 that preprocessing has terminated, or a determination in Step S10 that revolution misalignment is undetected, it is determined whether motor revolution subsequent to downshifting (or motor torque subsequent to downshifting) is less than a threshold value. In the case of a YES determination (post-shift motor revolution<threshold value), the methodology advances to Step S10, or in the case of a NO determination (post-shift motor revolution≥threshold value), advances to Step S11. Here, the threshold value for post-shift motor revolution is set to the upper limit value of the motor revolution range in which torque sufficient for cranking can be assured.

In Step S10, following a determination that post-shift motor revolution<threshold value in Step S9, it is determined whether the torque capacity of the shift release element at the time of an engine startup request (release clutch torque capacity) is less than a threshold value. In the case of a YES determination (release clutch torque capacity<threshold value), the methodology advances to Step S12, or in the case of a NO determination (release clutch torque capacity≥threshold value), advances to Step S11. Here, the threshold value for release clutch torque capacity is set to a value equivalent to driver-requested drive force it is desired to ensure during cranking.

In Step S11, following a determination that post-shift motor revolution≥threshold value in Step S9, or a determination that release clutch torque capacity≥threshold value in Step S10, the first simultaneous process control (FIG. 7) is selected, the first simultaneous process control is carried out, and the methodology advances to terminate control.

In Step 12, following a determination in Step S9 that post-shift motor revolution<threshold value, in addition to a determination in Step S10 that release clutch torque capacity<threshold value, the second simultaneous process control (FIG. 8) is selected, the second simultaneous process control is carried out, and the methodology advances to terminate control.

Figure 7:
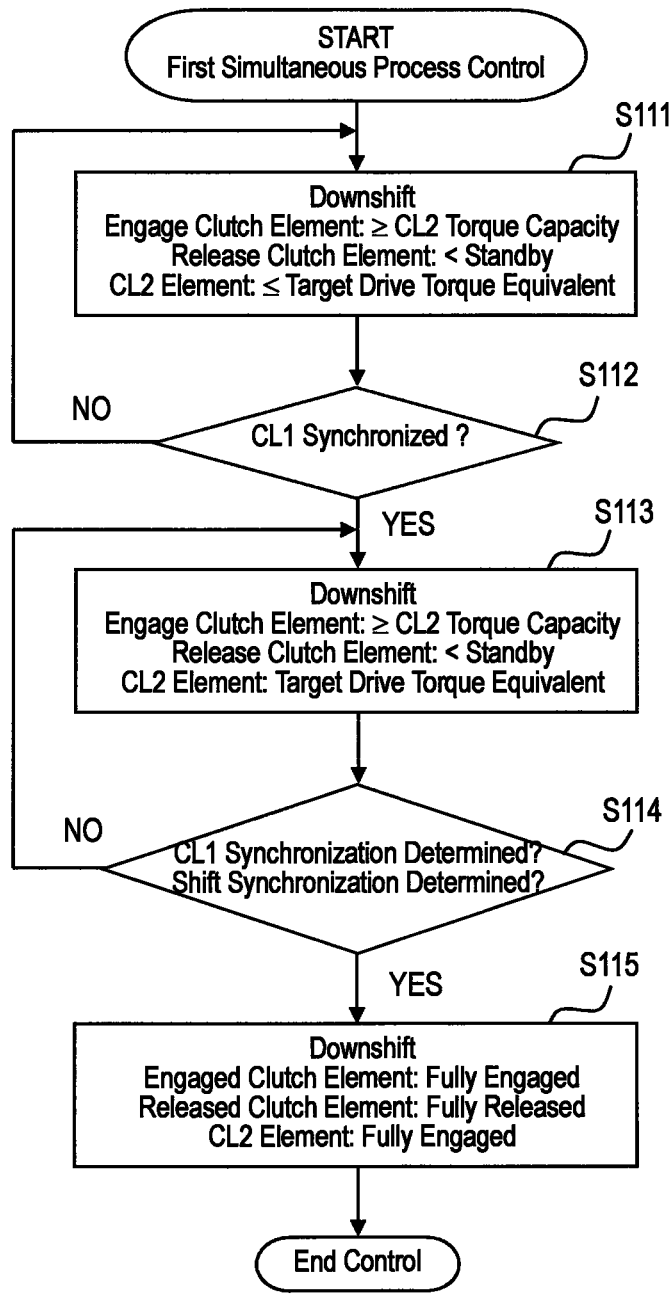
FIG. 7 is a flowchart showing the configuration and flow of the first simultaneous process control for startup first→then shift, carried out in Step S11 of FIG. 6.

FIG. 7 shows the configuration and flow (first simultaneous process control means) of the first simultaneous process control for startup first→then shift, carried out in Step S11 of FIG. 6. The steps of FIG. 7 are described below.

In Step S111, maintaining the torque capacity of the applying clutch clement element at standby capacity, and maintaining the torque capacity of the release clutch element at or above the torque capacity of the second clutch CL2, with the second clutch CL2 at or below the equivalent of the target drive torque, coordinated control is performed to proceed to engine startup control exclusively, without proceeding to downshift control, and the methodology advances to Step S112.

In Step S112, following coordinated control in Step S111 to proceed to engine startup control exclusively without proceeding to downshift control, it is determined whether the engine speed and the motor revolution speed, which are the input and output revolution speeds of the first clutch CL1, have coincided (=CL1 synchronization), that is, whether engine startup control has terminated. In the case of a YES determination (that there is CL1 synchronization), the methodology advances to Step S113, or in the event of a NO determination (that there is no CL1 synchronization), returns to Step S111.

In Step S113, following a determination in Step S112 that there is CL1 synchronization, or a termination determination, i.e., a CL2 synchronization determination and a shift synchronization determination, in Step S114, while maintaining vehicle drive force on the engine startup control side by bringing the torque capacity of the applying clutch clement element to at or above the torque capacity of the second clutch CL2, the torque capacity of the release clutch element to at or below the standby capacity, and the second clutch CL2 to the equivalent of the target drive torque, coordinated control is performed to proceed to shift control, and the methodology advances to Step S114.

In Step S114, following coordinated control in Step S113 to advance to shift control while maintaining drive force, it is determined whether a CL2 synchronization determination, indicating convergent input/output revolution differential of the second clutch CL2, has come into effect, and moreover whether a shift synchronization determination, indicating convergence of the actual gear ratio of the automatic transmission AT with the post-shift target gear ratio, has come into effect. In the case of a YES determination (coordinated control termination conditions have come into effect), the methodology advances to Step S115, or in the event of a NO determination (coordinated control termination conditions have not come into effect), returns to Step S113.

In Step S115, following a determination in Step S114 that coordinated control termination conditions have come into effect, the apply clutch clement element is fully applied, the release clutch clement element is fully released, the second clutch CL2 is fully applied, and the methodology advances to terminate control.

Figure 8:
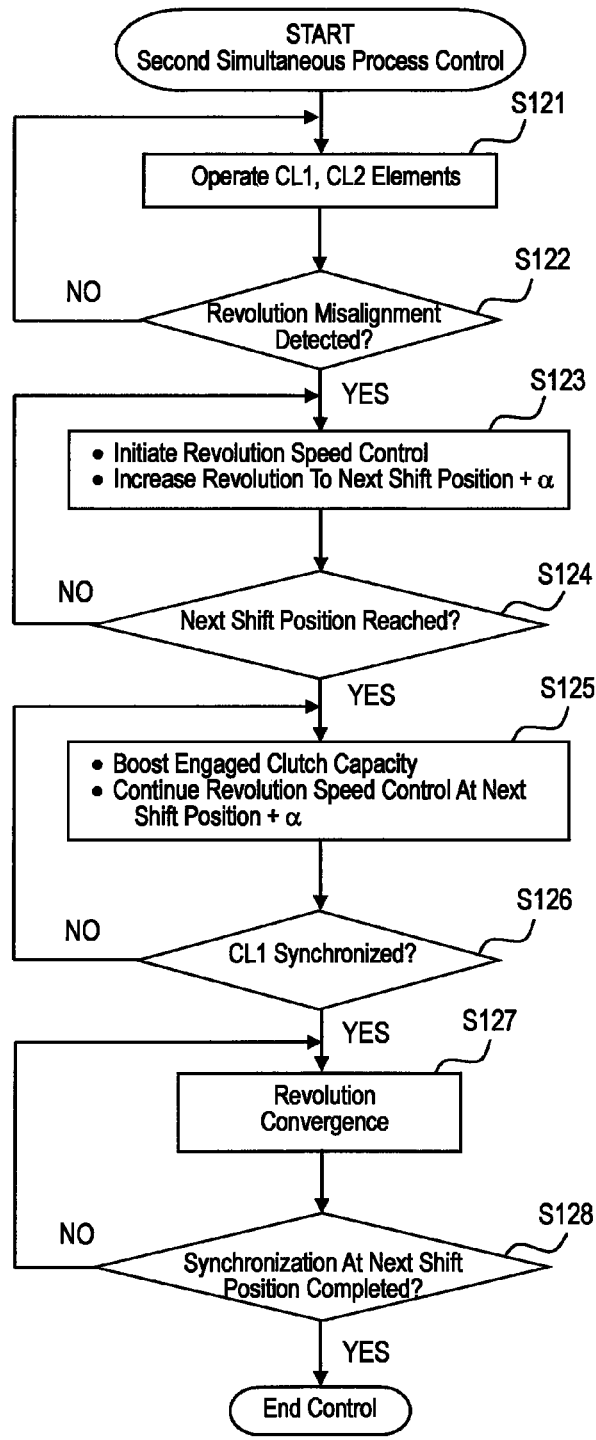
FIG. 8 is a flowchart showing the configuration and flow of the second simultaneous process control for Shift first→startup later, carried out in Step S12 of FIG. 6.

FIG. 8 shows the configuration and flow (second simultaneous process control means) of the second simultaneous process control for Shift first→startup later, carried out in Step S12 of FIG. 6. The steps of FIG. 8 are described below.

In Step S121, an application operation to place the first clutch CL1 into a state of semi-application is initiated, a release operation to place the second clutch CL2 in a state of slip application is initiated, and the methodology advances to Step S122.

In Step S122, following operation of the CL1 and CL2 elements in Step S121, it is determined whether revolution misalignment caused by slip application of the second clutch CL2 has been detected. In the case of a YES determination (revolution misalignment detected), the methodology advances to Step S123, and in the case of a NO determination (revolution misalignment undetected), returns to Step S121. Here, for revolution misalignment detection, as the ratio of input and output shaft rotation speeds in the automatic transmission AT is determined by the shift position gear ratio prior to downshifting, the extent of revolution misalignment can be detected from the relationship of input and output shaft rotation speeds.

In Step S123, following a determination in Step S122 that revolution misalignment was detected, or a determination in Step S124 that the next shift position has not been reached, revolution speed control by the motor/generator MG, in which a value calculated by adding a predetermined revolution speed α to the target input revolution speed of the next shift position to arrive at a target revolution speed, is initiated, the motor torque of the motor/generator MG is used to increase revolution to the target revolution speed, and the methodology advances to Step S124. That is, the act of proceeding to downshift is accomplished through increase of the revolution speed by the motor/generator MG, without relying on recharge of hydraulic pressure.

In Step S124, following revolution increase control in Step S123 to increase the input revolution speed to the next shift position+α, it is determined whether the next shift position has been reached, that is, whether the input revolution speed of the automatic transmission AT has reached the target revolution speed for the next shift position. In the case of a YES determination (next shift position reached), the methodology advances to Step S125, and in the case of a NO determination (next shift position not reached), returns to Step S123.

In Step S125, following a determination in Step S124 that the next shift position has been reached, the clutch application capacity of the applying clutch clement element in downshifting is boosted, and the clutch application capacity of the release clutch is lowered. Then, while continuing motor revolution speed control in which the (target input revolution speed of the next shift position+α) is the target revolution speed, the system proceeds to crank the engine Eng by the first clutch CL1 which is in the semi-applied state, and advances to Step S126. Specifically, in this Step S125, on/off hydraulic recharge control and engine startup control are performed while continuing to rely on revolution speed control by the motor/generator MG in proceeding to downshift in order to increase the input revolution speed. Once the engine speed reaches the predetermined revolution speed through cranking of the engine Eng, the engine Eng is started through the process of ignition through fuel injection and sparking, and transitions to a self-sustaining operational state.

In Step S126, following continued capacity control of the apply/release clutch and motor revolution speed control in Step S125, it is determined whether the engine speed and the motor revolution speed, which are the input and output revolution speeds of the first clutch CL1, have coincided (=CL1 synchronization). In the case of a YES determination (there is CL1 synchronization), the methodology advances to Step S127, or in the event of a NO determination (there is no CL1 synchronization), returns to Step S125.

In Step S127, following a determination in Step S126 that there is CL1 synchronization, the application capacity of the first clutch CL1 in the semi-applied state is boosted to bring it to the fully applied state. Then, with the engine speed and the target revolution speed of the motor revolution speed at the (target input revolution speed for the next shift position), revolution convergence is brought about in the direction of decreasing the revolution speed from the (target input revolution speed of the next shift position+α) to the (target input revolution speed of the next shift position), and the methodology advances to Step S128.

In Step S128, following revolution convergence of the engine speed and the motor revolution speed in Step S127, it is determined whether the engine speed and the motor revolution speed are at the target input revolution speed for the next shift position, completing synchronization at the next shift position. In the case of a NO determination (synchronization at next shift position is not completed), the methodology returns to Step S127. In the case of a YES determination (synchronization at next shift position is completed), the methodology advances to terminate control, switches motor control from revolution speed control to torque control, switches the second clutch CL2 from slip application to full application, and raises the downshifting applying clutch clement element hydraulic pressure to the line pressure, and transitions to "HEV driving mode."

The actions of the device will be described next. The actions of the FR hybrid vehicle control device of Example 1 shall be described in terms of separate categories of "action of independent control of engine startup," "action of simultaneous process control selection of engine startup and downshifting," "first simultaneous process control action," and "second simultaneous process control action."

In cases where an engine startup request and a downshift request are issued at overlapping timing, simultaneous processing is necessary. However, in a case where a downshift request has been issued at timing apart from an engine startup request, only a process for engine startup control is performed, in response to the engine startup request. The action of independent control of engine startup reflective of this situation shall be described below.

Let it be assumed that, with "EV driving mode" selected, when there is an engine startup request in association with "HEV driving mode" having been selected as the target driving mode, the system is not currently downshifting, and there is no downshift request. In this case, the methodology advances from Step S1→Step S2→Step S3→Step S5→Step S6 in the flowchart of FIG. 6, with engine startup control being initiated in Step S2. Subsequently, as long as a state with no current downshifting and with no downshift requests continues, independent control of engine startup is performed by repeating the flow of advance from Step S3→Step S5→Step S6.

Now, let it be assumed that, with "EV driving mode" selected, when there is an engine startup request in association with "HEV driving mode" having been selected as the target driving mode, the system is currently downshifting, and moreover shifting has proceeded to past the finish phase. In this case, the methodology advances from Step S1→Step S2→Step S3→Step S4→Step S6 in the flowchart of FIG. 6, with engine startup control being initiated in Step S2. Subsequently, normal downshift control in which downshifting proceeds as-is, and independent control of engine startup through repetition of the flow of advance from Step S3→Step S4→Step S6, are respectively performed.

In this independent control of engine startup, the first clutch CL1, which is released in "EV driving mode," is placed in a semi-applied state, the engine Eng is cranked by the motor/generator MG as the starter motor, the engine Eng is started up by fuel supply and sparking, and the first clutch CL1 is applied.

In the case of simultaneous processing of control of both an engine startup request and a downshift request made at overlapping timing, when a single pattern for which a processing methodology has been decided beforehand is performed, there are scenarios in which shock performance or lag performance are unsatisfactory. Therefore, in the case of performing simultaneous processing, it is necessary for shock performance and lag performance to be satisfactory under any scenario. The action of simultaneous process control selection of engine startup and downshifting reflective of this situation shall be described below.

Figure 9:
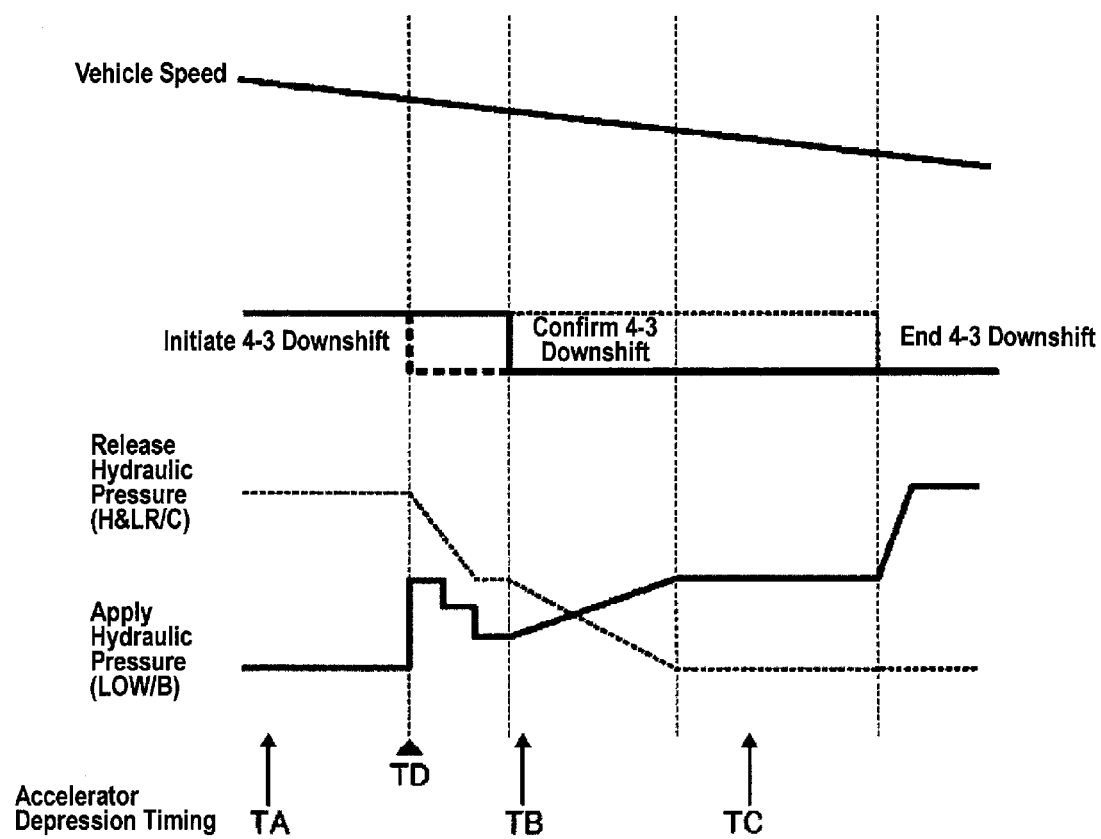
FIG. 9 is a time chart showing characteristics of vehicle speed, shift command signal type, release hydraulic pressure, apply hydraulic pressure when simultaneous processing of 4→3 downshifting and engine startup is performed according to typical patterns of differences in startup request timing (accelerator depression timing)

For example, typical patterns of differences in startup request timing (accelerator depression timing TA, TB, TC) when simultaneous processing a 4→3 downshift request and an engine startup request are described in FIGS. 2 and 9.

(a) Accelerator depression timing TA—Accelerator depression timing TA represents a scenario in which the accelerator is depressed while the vehicle speed is crossing over the 4→3 downshift line from the high end. For example, during driving through selection of "EV driving mode" in fourth gear, when the driver performs an accelerator depression maneuver with the intention of accelerating, the operating point (APO, VSP) on the shift map shown in FIG. 2 travels from point G to point G'. At this time, an engine startup request is issued first, by virtue of crossing the EV→HEV switchover line at point g during travel of the operating point, and subsequently, a 4→3 downshift request (timing TD) is issued by virtue of crossing the 4→3 downshift line at point g'.

In this case, because the vehicle speed crosses over the 4→3 downshift line from the high end, it is highly likely that post-shift motor rotation will be equal to or greater than the threshold value, so the first simultaneous process control is selected.

(b) Accelerator depression timing TB—Accelerator depression timing TB represents a scenario for the 4→3 coastdown torque phase, in which the accelerator is depressed in a stage of remaining release capacity. For example, during coasting through selection of "EV driving mode" in fourth gear, when the driver performs an accelerator depression maneuver with the intention of accelerating, the operating point (APO, VSP) on the shift map shown in FIG. 2 travels from point H to point H'. At this time, a 4→3 downshift request (timing TD) is issued first, by virtue of crossing the 4→3 downshift line at point h' during travel of the operating point; and immediately thereafter, an engine startup request is issued by virtue of crossing the EV→HEV switchover line at point h. As this is a case of 4→3 coastdown, it is highly likely that post-shift motor rotation will be less than the threshold value, but when the remaining release capacity is equal to or greater than the threshold value, the first simultaneous process control is selected, whereas when the remaining release capacity is less than the threshold value, the second simultaneous process control is selected.

(c) Accelerator depression timing TC—Accelerator depression timing TC represents a scenario for a 4→3 coastdown inertia phase, in which the accelerator is depressed in a stage after release capacity has been vented. For example, during coasting through selection of "EV driving mode" in fourth gear, when the driver performs an accelerator depression maneuver with the intention of accelerating, the operating point (APO, VSP) on the shift map shown in FIG. 2 travels from point I to point I'. At this time, a 4→3 downshift request (timing TD) is issued first, by virtue of crossing the 4→3 downshift line at point i' during travel of the operating point; and thereafter, an engine startup request is issued by virtue of crossing the EV→HEV switchover line at point i. As this is a case of 4→3 coastdown, it is highly likely that post-shift motor rotation will be less than the threshold value, but as this occurs after the release capacity is vented, the remaining release capacity is less than the threshold value, and the second simultaneous process control is selected.

Let it be assumed that the driving scenario is a scenario in which the accelerator is depressed as vehicle speed crosses the 4→3 downshift line from the high end, with the engine startup request being issued first, and the 4→3 downshift request issued subsequently, and with post-shift motor rotation being equal to or greater than the threshold value. At this time, the flow advances from Step S7 or Step S8, to Step S9→Step S11→control termination in the flowchart of FIG. 6.

Additionally, let it be assumed that the driving scenario is a 4→3 coastdown torque phase scenario in which the accelerator is depressed in a stage in which there is remaining release capacity, with the 4→3 downshift request being issued first, and the engine startup request issued subsequently, with post-shift motor rotation being less than the threshold value, and with the release clutch torque capacity being equal to or greater than the threshold value. At this time, the flow advances from Step S7 or Step S8, to Step S9→Step S10→Step S11→control termination in the flowchart of FIG. 6.

For example, in a scenario of high motor revolution subsequent to shifting, such as a scenario in which the accelerator is depressed as vehicle speed crosses the 4→3 downshift line from the high end, when (Shift first→startup later) second simultaneous process control is selected, the motor torque operational range is narrow. Consequently, motor torque sufficient for cranking cannot be ensured thereby, and shock occurs. In contrast to this, when (Startup first→shift later) first simultaneous process control is selected in a scenario of high motor revolution subsequent to shifting, motor torque sufficient for cranking can be ensured, and shock prevented.

For example, in a scenario of low motor revolution subsequent to shifting, as in a 4→3 coastdown torque phase scenario, in which the accelerator is depressed in a stage of remaining release capacity, motor torque sufficient for cranking can be ensured, and it is therefore possible to select the second simultaneous process control. However, when the remaining release capacity is equal to or greater than the threshold value, because drive force can be assured by the remaining release capacity, by selecting the first simultaneous process control, satisfactory shock performance and lag performance are achieved, while reducing consumption of motor torque.

The driving scenario is a 4→3 coastdown torque phase scenario in which the accelerator is depressed in a stage of remaining release capacity, or a 4→3 coastdown inertia phase scenario in which the accelerator is depressed in a stage after release capacity has been vented. The 4→3 downshift request is first, and the engine startup request is issued subsequently, with post-shift motor rotation being less than the threshold value, and with the release clutch torque capacity being less than the threshold value. At this time, the flow advances from Step S7 or Step S8, to Step S9→Step S10→Step S12→control termination in the flowchart of FIG. 6.

For example, when (Startup first→shift later) first simultaneous process control is selected in a scenario of low release capacity during downshifting, sufficient drive force cannot be transmitted during cranking, causing the driver to feel lag. In contrast to this, when (Shift first→startup later) second simultaneous process control is selected in a scenario of low release capacity during downshifting, sufficient drive force can be transmitted via the automatic transmission AT in the downshifting-terminated state during cranking, preventing the driver from feeling lag.

In the aforedescribed manner, there has been has been adopted herein a configuration in which (Startup first→shift later) first simultaneous process control and (Shift first→startup later) second simultaneous process control are prepared, wherein when engine startup and downshifting are simultaneously processed during driving, either one of these controls is selected on the basis of an determination of the scenario prior to initiating simultaneous processing. By virtue of this configuration, either (Startup first→shift later) first simultaneous process control or (Shift first→startup later) second simultaneous process control can be used selectively according to determinations of the scenario prior to initiating simultaneous processing, so that shock and lag do not occur. Consequently, when engine startup control and downshift control are simultaneously processed during driving, satisfactory shock performance and lag performance are achieved in any scenario.

Moreover, there has been has been adopted herein a configuration whereby it is determined whether post-shift motor revolutions are less than a threshold value, selecting the first simultaneous process control when the post-shift motor revolutions are equal to or greater than the threshold value (Step S9). Here, higher post-shift motor revolutions means a narrower operational range of motor torque, so that the torque necessary for engine startup (cranking) cannot be output. Consequently, by selecting the first simultaneous process control when the post-shift motor revolutions are equal to or greater than the threshold value, shock resulting from inability to output the torque necessary for engine startup is prevented.

Furthermore, there has been has been adopted herein a configuration whereby it is determined whether the release clutch torque capacity when an engine start request is made is less than a threshold value, selecting the second simultaneous process control when the release clutch torque capacity is less than the threshold value (Step S10). Here, when the release clutch torque capacity when an engine start request is made is low, sufficient drive force cannot be transmitted during cranking. Consequently, by selecting the second simultaneous process control when the release clutch torque capacity is less than the threshold value, the driver can be prevented from feeling lag.

During simultaneous processing of engine startup control and downshift control, only startup control is prompted to proceed by cranking with downshift control suspended, subsequent to downshift preprocessing. (Startup first→shift later) first simultaneous process control action for the purpose of prompting downshift control to proceed through recharge hydraulic pressure control of the apply clutch and the release clutch after synchronization of the first clutch CL1 has been determined will be described. For example, in a case where a 4→3 downshift request has been issued, a second brake B2 (LOW/B) serves as an apply clutch element in 4→3 downshifting, and a third clutch C3 (H&LR/C) as a release clutch element in 4→3 downshifting. A second clutch (D/C) serves as the second clutch CL2 for slip control during engine startup control.

The first simultaneous process control action is described on the basis of the flowchart shown in FIG. 7. In Step S111, until synchronization of the first clutch CL1 has been determined in Step S112, slip control by the second clutch CL2 is performed at a torque capacity which is lower than the torque capacity of the element that, of the release clutch element and the apply clutch element, is that having higher torque capacity, and which is equal to or less than the equivalent of the target drive torque.

Once synchronization of the first clutch CL1 has been determined in Step S112, the methodology advances from Step S112 to Step S113, and in Step S113, slip control by the second clutch CL2 is performed at a torque capacity which is lower than the torque capacity of the apply clutch element and equal to or less than the equivalent of the target drive torque, until CL2 synchronization and shift synchronization are determined in Step S114.

Specifically, when both engine startup and downshifting have been requested, during slip control before and after the CL1 synchronization determination, the torque capacity of the second clutch CL2 is continuously controlled to a level below the torque capacity of the frictional element that, of the release clutch element and the apply clutch element participating in shifting, is that having higher torque capacity. Consequently, by performing torque capacity control of the second clutch CL2 with consideration to the torque capacity of the frictional elements applied and released during shifting, the drive torque applied to the drive wheels, i.e., the left and right rear wheels RL, RR, during engine startup control is determined by the torque capacity of the second clutch CL2, and therefore the vehicle drive force can be controlled in a reliable manner through the torque capacity of the second clutch CL2, before and after the first clutch CL1 synchronization determination.

Moreover, the torque capacity of the second clutch CL2 is differentiated before and after the CL1 synchronization determination, so that before the CL1 synchronization determination, slip control of the second clutch CL2 is performed at a torque capacity equal to or less than the equivalent of the target drive torque, whereas after the CL1 synchronization determination, slip control of the second clutch CL2 is performed at torque capacity equivalent to the target drive torque. Consequently, in the engine cranking range before the CL1 synchronization determination, while ensuring vehicle drive force by bringing the second clutch CL2 to torque capacity equal to or less than the equivalent of the target drive torque, the occurrence of cranking shock can be held down by holding down the torque capacity of the second clutch CL2 with respect to the engine cranking operation, maintaining a slip application state. Then, in the engine startup control convergence range following the CL1 synchronization determination in which the drive force response request increases to a high level, by making the torque capacity equivalent to the target drive torque while maintaining slip application by the second clutch CL2, generation of the vehicle drive force intended by the driver is ensured, concomitantly with display of shock absorbing functionality.

Figure 10:
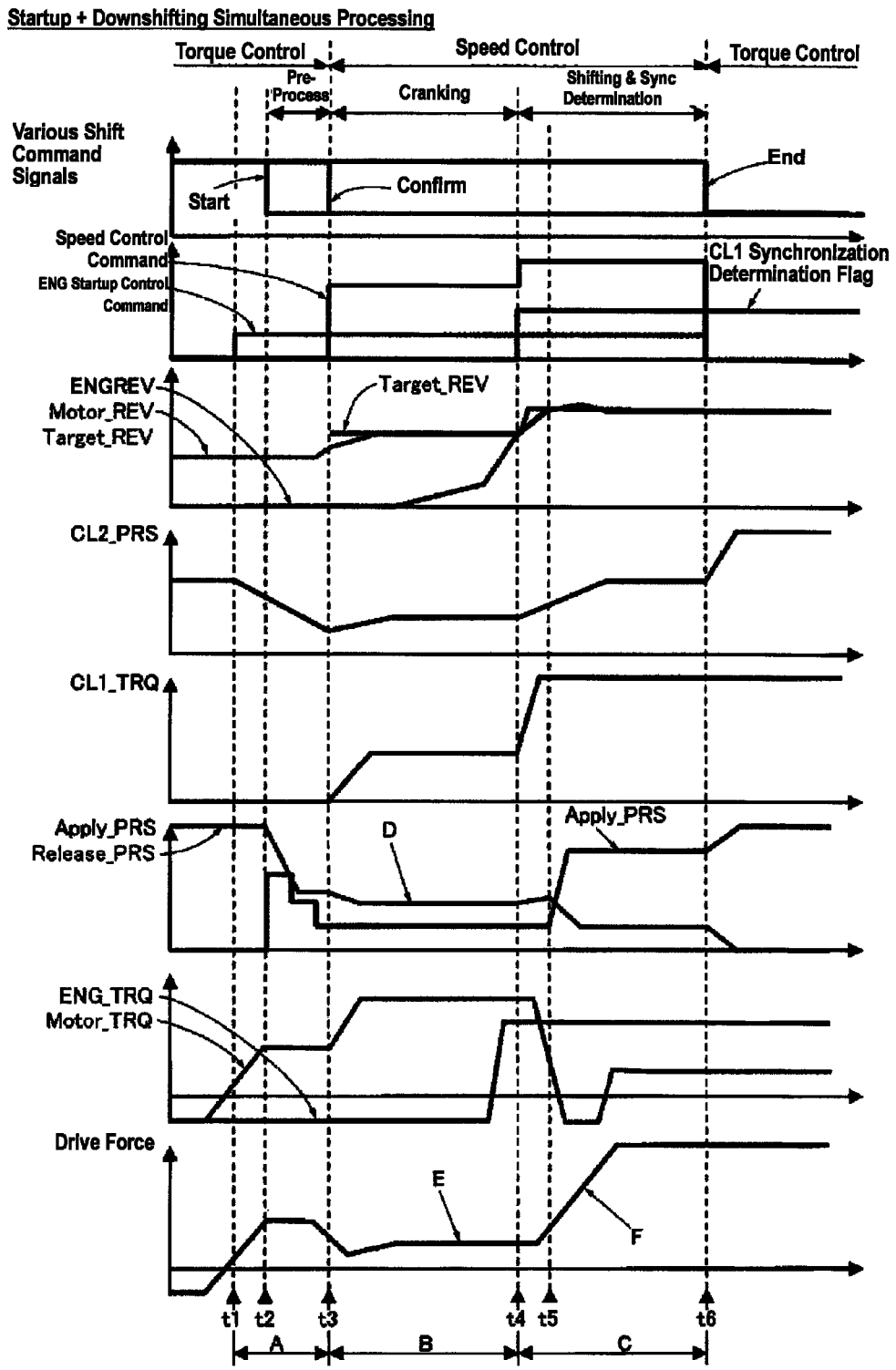
FIG. 10 is a time chart showing characteristics of shift command signal type, revolution speed control command, engine startup control command, CL1 synchronization determination flag, engine speed (ENGREV), motor revolution speed (Motor_REV), target motor revolution speed (Target_REV), second clutch pressure (CL2_PRS), first clutch torque (CL1_TRQ), apply pressure (Apply_PRS), release pressure (Release_PRS), engine torque (ENG_TRQ), motor torque (Motor_TRQ), and drive force, when first simultaneous process control is executed during EV driving of an FR hybrid vehicle having the control device of example 1 installed.

Next, the first simultaneous process control action is described on the basis of the time chart shown in FIG. 10. The time chart of FIG. 10 shows a case in which, during driving through selection of "EV driving mode" in fourth gear, the driver performs an accelerator depression maneuver with the intention of accelerating, causing an engine startup request to be issued first, and then a 4→3 downshift request to be issued. In FIG. 10, time t1 shows the timing of the engine startup request. Time t2 shows the timing of the downshift request. Time t3 is the termination point of preprocessing by torque control, as well as showing the start point of cranking by revolution speed control, Time t4 shows the CL1 synchronization point. Time t5 shows the start point of downshifting by recharge hydraulic pressure control. Time t6 shows the termination point of simultaneous processing of engine startup control and downshift control.

In the time chart of FIG. 10, when there is an engine startup request at time t1, slip control of the second clutch CL2 is initiated by a decrease in clutch pressure, as shown by the characteristics of the second clutch (CL2_PRS). Thereafter, when there is a downshifting request at time t2, the pre-process (standby phase) for the engaged clutch element and the disengaged clutch element of downshifting is initiated, as shown by the characteristics of the engaging pressure (Apply_PRS) and the disengaging pressure (Release_PRS). Thereafter, when the pre-process ends at time t3, the motor/generator MG switches from torque control to speed control, and control is ended in the area A from time t1 until time t2 during which the torque capacity of the second clutch CL2 is reduced.

In area B, from time t3 when the pre-process ends until time t4 when CL1 synchronization is determined, the torque capacity of the engaged clutch element is maintained at standby capacity as shown by the characteristics of the engaging pressure (Apply_PRS), and the torque capacity of the disengaged clutch element is maintained at or above the torque capacity of the second clutch CL2, whereby shift control of downshifting does not progress. The torque capacity of the second clutch CL2 is kept less than the disengaged clutch torque capacity and equal to or less than the target drive torque as shown by the characteristics of the second clutch pressure (CL2_PRS), whereby drive force is managed at the torque capacity of the second clutch CL2. In other words, in area B, downshifting control does not progress, and only engine startup control by engine braking progresses, as shown by the characteristics of the engine speed (ENGREV)

and the first clutch torque (CL1_TRQ). Control is then performed for causing the initial explosion in the engine by fuel supply and ignition.

As shown in FIG. 10, in range C from the time t4 at which CL1 synchronization is determined until the time t6 at which CL2 synchronization is determined, the transmission input revolution speed is increased up to the revolution speed of the post-shift gear position through motor revolution speed control, from time t4 to time t5. On the shift control side, the torque phase is maintained from time t4 to time t5; and when time t5 is reached, the apply pressure rises at a sharp gradient as shown by the apply pressure (Apply_PRS) characteristic, bringing the torque capacity of the apply clutch clement element to at or above the torque capacity of the second clutch CL2, and bringing the torque capacity of the release clutch element to at or below the standby capacity as shown by the release pressure (Release_PRS) characteristic, prompting downshifting to proceed by the inertia phase. Then, by bringing the torque capacity of the second clutch CL2 into equivalence with the target drive torque, as shown by the second clutch pressure (CL2_PRS) characteristic, the drive force is managed with the torque capacity of the second clutch CL2. That is, in range C, in addition to prompting downshifting to proceed, the started-up engine is subjected to torque control to the equivalent of the target drive torque, whereby control to ensure that vehicle drive force increases in response to an acceleration request performed, as shown by the drive force characteristic.

Upon reaching time t6 at which CL2 synchronization is determined, the motor/generator MG is returned from revolution speed control to torque control, and as shown by the apply pressure (Apply_PRS) characteristic and the release pressure (Release_PRS) characteristic, the apply clutch clement element is fully applied, and the release clutch clement element is fully released, to again perform application control of the second clutch CL2 in the manner shown by the second clutch pressure (CL2_PRS) characteristic.

Thus, according to the concept of the (engine startup+ downshift) first simultaneous process control, the second clutch CL2, which is the slip control element, serves as the clutch of maximum torque cutoff and independent from downshifting, with downshifting being accomplished during torque capacity control of the second clutch CL2.

The "concept of range B" from time t3 to time t4, and the "concept of range C" from time t4 to time t5, are as described below.

Concept of range B—Of the three clutches which are applied in the in-gear state (in fourth gear, C2, C3, B3), two elements, namely, the second clutch CL2 constituting the slip control element (second clutch CL2) and the release clutch element constituting the shift release element (third clutch C3), are subjected to torque capacity control. Here, the basic concept is that: drive force (drive force characteristic E) is controlled bringing the CL2 torque capacity to below the release clutch torque capacity (the release pressure (Release_PRS) characteristic D, prompting slip of the second clutch CL2. Additionally, for the following reason, in range B, shift control is not transitioned into the synchronization determination phase.

During cranking of the engine Eng, apply element ↔ release element replacement is not performed.

In so doing, change in the burden share and cutoff effect of the second clutch CL2 due to changing internal status of the automatic transmission AT can be prohibited. The release element of shifting does not move during cranking of the engine Eng. In so doing, the second clutch CL2 can be maintained in a continuous slip application state during cranking of the engine Eng.

Concept of range C—Replacement of apply element ↔ release element of downshifting, and torque capacity control of the second clutch CL2, are carried out simultaneously. Drive force increases (drive force characteristic F) then rises. Here, downshifting can be prompted to proceed in a reliable manner by:

bringing CL2 torque capacity to less than the apply clutch torque capacity, and
 reducing the release element to at or below standby pressure.

Furthermore, upon realization of both:

synchronization determination by differential revolution convergence (calculated from revolution sensor information) for the second clutch CL2, and synchronization determination through gear ratio for shift control, in order to verify that subsequent to downshifting the apply clutch element has locked up (fully applied state), control is terminated.

During simultaneous processing of engine startup control and downshift control, downshift control is prompted to proceed subsequent to downshift preprocessing, followed by prompting startup control by cranking to proceed. (Shift first→startup later) second simultaneous process control action to prompt downshift control to determine synchronization of the first clutch CL1 will be described. For example, in a case where a 4→3 downshift request has been issued, a second brake B2 (LOW/B) serves as an apply clutch element in 4→3 downshifting, and a third clutch C3 (H&LR/C) as a release clutch element in 4→3 downshifting. A second clutch C2 (D/C) serves as the second clutch CL2 for slip control during engine startup control.

The second simultaneous process control action is described on the basis of the flowchart shown in FIG. 8. In Step S121, after completion of preprocessing until revolution misalignment is detected in Step S122, an application operation is initiated to place the first clutch CL1 in the semi-applied state, and a release operation is initiated to place the second clutch CL2 in the slip application state.

When revolution misalignment is detected in Step S122, in Step S123, revolution speed control by the motor/generator MG, in which a value obtained by adding a predetermined revolution speed a to the target input revolution speed of the next shift position is designated as the target revolution speed, is initiated. Then, revolution increase control is executed to increase the revolution speed to the target revolution speed using the motor torque of the motor/generator MG, until determining in Step S124 that the next shift position has been reached.

When the next shift position is determined to have been reached in step S124, in step S125, the clutch engaging capacity of the engaged clutch in downshifting is raised to a level of maintaining the torque capacity of the next shift position, and the clutch engaging capacity of the disengaged clutch is lowered (drained). Motor speed control for setting (the target input speed of the next shift position+α) to the target speed is continued until the first clutch CL1 is determined to have synchronized in step S126, and cranking of the engine Eng by the semi-engaged first clutch CL1 proceeds.

When it is determined in step S126 that the first clutch CL1 has synchronized, in step S127, the engaging capacity of the semi-engaged first clutch CL1 is increased to a fully-engaged state. Until the determination in step S128 that synchronization in the next shift position is complete, control is performed whereby the target speeds of the engine speed and the motor speed are set to (the target input speed of the next shift position), and rotation convergence causes the speed to decrease from (the target input speed of the next shift position+α) to (the target input speed of the next shift position).

When it is determined in step S128 that synchronization in the next shift position is complete, simultaneous processing control is ended, the motor control is switched from speed control to torque control, and the second clutch CL2 is switched from slip-engaged to fully engaged. The engaged clutch oil pressure of downshifting is increased to the line pressure to transition to "HEV travel mode."

Figure 11:
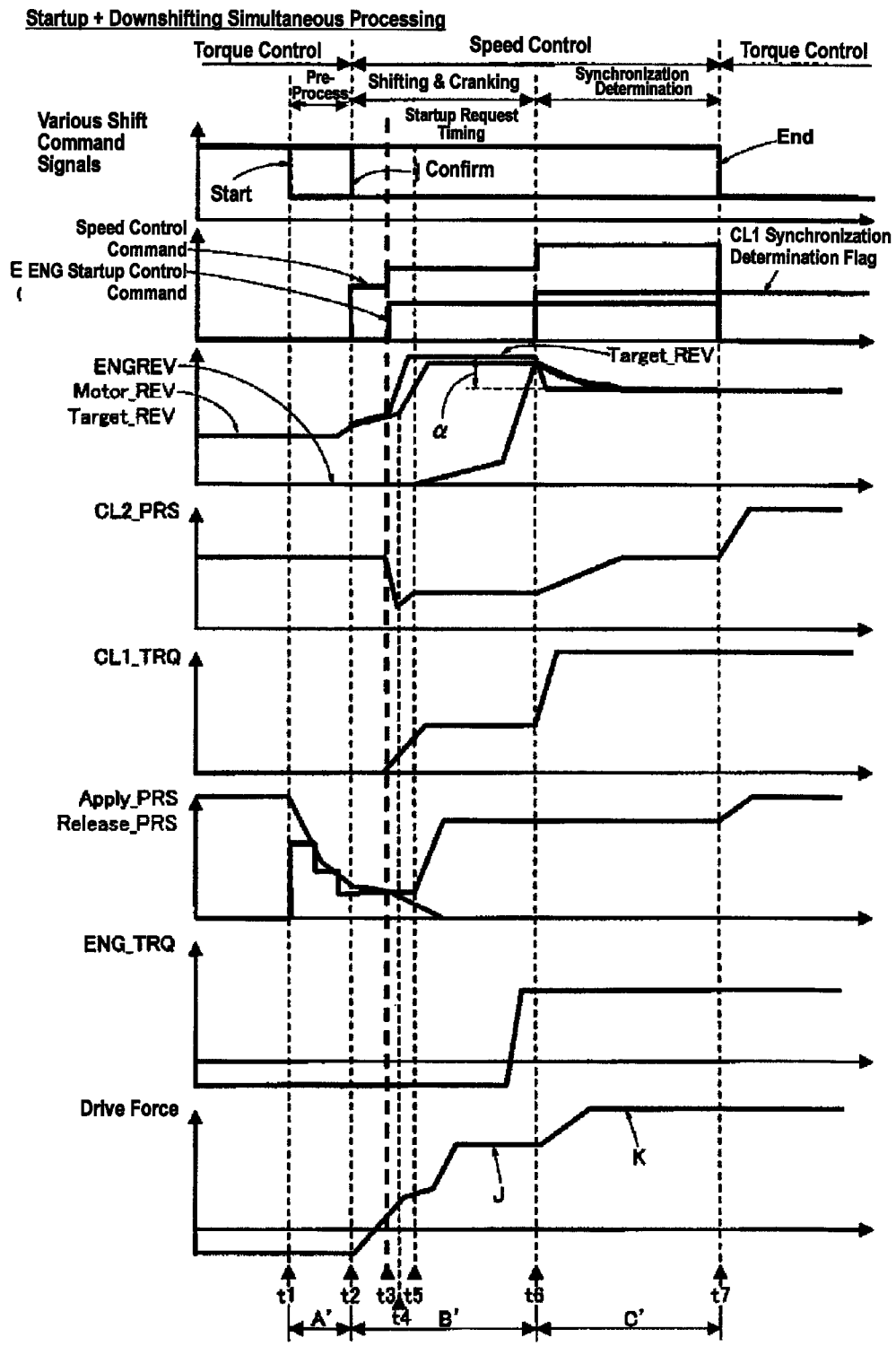
FIG. 11 is a time chart showing characteristics of shift command signal type, revolution speed control command, engine startup control command, CL1 synchronization determination flag, engine speed (ENGREV), motor revolution speed (Motor_REV), target motor revolution speed (Target_REV), second clutch pressure (CL2-PRS), first clutch torque (CL1_TRQ), apply pressure (Apply_PRS), release pressure (Release_PRS), engine torque (ENG_TRQ), motor torque (Motor_TRQ), and drive force, when second simultaneous process control is executed during EV driving of an FR hybrid vehicle in which the control device of example 1 is installed.

The second simultaneous process control action is described on the basis of the time chart shown in FIG. 11. The time chart of FIG. 11 shows a case in which, during coasting through selection of "EV driving mode" in fourth gear, the driver performs an accelerator depression maneuver with the intention of accelerating, causing a 4→3 downshift request to be issued first, and an engine startup request to be issued thereafter. In FIG. 11, time t1 shows the downshift request timing at which preprocessing starts. Time t2 shows the preprocessing termination point, as well as the point of switchover from torque control to revolution speed control. Time t3 shows the engine startup request timing. Time t4 shows the start point of input revolution speed control through motor revolution speed control. Time t5 shows the point of reaching the next shift position. Time t6 shows the CL1 synchronization point. Time t7 shows the termination point of simultaneous processing of engine startup control and downshift control.

The following is a description of the control operation of area A' from time t1 to time t2 when the pre-process is executed in the time chart of FIG. 11. When there is a downshifting request at time t1, the pre-process (standby phase) for the engaged clutch element and the disengaged clutch element of the downshifting is initiated, as shown by the characteristics of the engaging pressure (Apply_PRS) and the disengaging pressure (Release_PRS). Then, when the pre-process ends at time t2, the motor/generator MG is switched from torque control to speed control, and the control of area A', in which the pre-process is performed in advance of the simultaneous processing, is ended.

Next is a description of the control operation of area B', from the pre-process ending time t2 until the time t6 at which downshifting and cranking end. From time t2 of switching to speed control until time t3 at which there is an engine startup request, speed control is performed for gradually increasing the motor speed (=transmission input speed) along the target motor speed (Target_REV), as shown by the characteristics of the motor speed (Motor_REV). The motor torque thereby increases, whereby the negative drive force changes to positive drive force as shown by the drive force characteristics. When there is an engine startup request at time t3, slip control of the second clutch CL2 is initiated by a decrease in clutch pressure, as shown by the characteristics of the second clutch pressure (CL2_PRS). At the same time, the first clutch CL1 is given a torque capacity by causing the piston of the first clutch CL1 to travel a stroke towards semi-engagement, as shown by the characteristics of the first clutch torque (CL1_TRQ). When it is then confirmed that the second clutch CL2 is slip-engaged at time t4, speed control is performed for increasing the motor speed all at once to the target motor speed (Target_REV), which is set to the target input speed of the next shift position+α, as shown by the characteristics of the motor speed (Motor_REV). When the motor speed (Motor_REV) then reaches the next shift position input speed at time t5, the torque capacity of the engaged clutch element is increased as shown by the characteristics of the engaging pressure (Apply_PRS), and the disengaged clutch element is drained and disengaged as shown by the characteristics of disengaging pressure (Release_PRS). Thereby, at the time point when the torque capacity of the engaged clutch element is ensured immediately after time t5, downshifting advances until the ending area. The torque capacity of the second clutch CL2 is then made to equal the target drive torque as shown by the characteristics of the second clutch pressure (CL2_PRS), whereby the drive force is managed by the torque capacity of the second clutch CL2. From time t5 to time t6, in a progression that overlaps the ending area of downshifting, engine startup control is made to progress by engine cranking as shown by the characteristics of the engine speed (ENG_REV) and the first clutch torque (CL1_TRQ). The engine startup control is thereby ended in time t6 which is after the downshifting.

The following is a description of the control operation of area C', from time t6 when the CL1 synchronization is determined until time t7 when synchronization in the next shift position is complete. When the CL1 synchronization is determined at time t6, the engine Eng and the motor/generator MG are directly linked via the engaged first clutch CL1 by causing the piston of the first clutch CL1 to travel a stroke towards fully engaging, as shown by the characteristics of the first clutch torque (CL1_TRQ). At time t6 when the CL1 synchronization is determined, the engine speed and the motor speed are at the target motor speed (Target_REV) which is set to the target input speed of the next shift position+α, and the engine speed is therefore gradually reduced by motor speed control to the input speed of the next shift position. The engine speed and the motor speed then converge on the input speed of the next shift position at time t7, thereby ending area C'.

Thus, according to the concept of the second simultaneous process control, as in the first simultaneous process control, the second clutch CL2, which is the slip control element, serves as the clutch of maximum torque cutoff and independent from downshifting. According to the "concept of range B" from time t2 to time t6, downshifting (revolution increase) is terminated during cranking, and after revolution increase, the first clutch CL1 is synchronized. That is, the second simultaneous process control is performed through (shift first→startup later).

As shown in FIG. 9, an engine startup request may intervene at various timing. In response, by performing simultaneous processing to terminate downshift control prior to engine startup control, the internal state of the automatic transmission AT at the point of termination of downshift control (a point soon after the time t5 at which the apply element has torque capacity) changes to the drive force transmission state of the next shift position.

Consequently, drive force management performed during cranking is not dependent on downshift control release pressure, which is at different levels due to changes in the timing of engine startup requests. Specifically, drive force management during cranking is readily performed through capacity management of the clutch CL2 as shown by drive force characteristic J in FIG. 11, when the internal state of the automatic transmission AT changes to the drive force transmission state of the next shift position.

Moreover, by performing simultaneous processing to terminate downshift control prior to engine startup control, the internal state of the automatic transmission AT enters a post-downshift shift position state in which high drive force is transmittable, at an earlier point in time than in the case of the first simultaneous process control, in which downshift control proceeds subsequent to termination of engine startup control. Consequently, as shown by drive force characteristic K in FIG. 11, the interval from the point t3 of initiating an engine startup request to the time at which the driver's intended drive force is a reached (a point soon after time t6) is shortened.

Further, in the case of the second simultaneous process control in which downshift control is performed with precedence over engine startup control, it is necessary to stabilize shock and lag of startup and downshifting, in a manner not dependent upon startup request timing. Downshifting action through revolution speed control reflecting this is described below.

Downshifting control for increasing the transmission input shaft speed during downshifting which requires a short amount of time, assuming that the transmission output shaft speed (=vehicle speed), which has large inertia, is constant. When this speed increase control is performed by replacement control of the engaged element and the disengaged element of the downshifting, the disengaged element is operated smoothly by lowering the torque capacity of the disengaged element, and the transmission input shaft speed is slowly increased. The speed increase control is then performed by precise load control wherein the moment the transmission input shaft speed reaches the target speed of the next shift position, the engaged element is put into a torque-transmitting state, the transmitted torque is allotted, and the torque capacity of the disengaged element is quickly cut off. However, although it is preferable to quickly cut off the torque capacity of the disengaged element the moment the transmission input shaft speed reaches the target speed, when even a small torque capacity remains in the disengaged element, negative torque is transmitted to the drive system, which readily causes draw shock.

Embodiment 1 employs a configuration in which the increase in input speed from downshifting is achieved by speed control for using the motor torque of the motor/generator MG to increase the speed to the target input speed. With this configuration, downshifting progresses responsively due to the speed increase of the motor/generator MG. Downshifting control by oil pressure replacement should be simple so that the engaged element of downshifting can be known after the input speed has increased. Therefore, not only can the time required from the start of downshifting to the end of downshifting be shortened, but downshifting control that prevents draw shock can be easily performed.

In Embodiment 1, the target motor speed (Target_REV) in motor speed control is the predetermined value α added to the target input speed of the next shift position. Therefore, while engine startup control (cranking) is performed, the predetermined value α is designated as the slip amount in the next shift position, and the second clutch CL2 is guaranteed to be slip-engaged.

The effect of the invention is described next. The FR hybrid vehicle control device of Example 1 affords the effects cited below by way of example.

(1) A device provided with: an engine Eng; a motor (motor/generator MG) provided to a drive system leading from the engine Eng to drive wheels (left and right rear wheels RL, RR), and having an engine startup motor function in addition to a drive motor function; a first clutch CL1 for switching to hybrid vehicle drive mode (HEV drive mode) through application, or to electric car driving mode (EV drive mode) through release, the first clutch CL1 being interposed between the engine Eng and the motor (motor/generator MG); an automatic transmission AT interposed between the motor (motor/generator MG) and the drive wheels (left and right rear wheels RL, RR), for automatically modifying the gear ratio; a second clutch CL2 for maintaining a slip application state during engine startup control, the second clutch CL2 interposed at any position from the motor (motor/generator MG) to the drive wheels (left and right rear wheels RL, RR); first simultaneous process control means (FIG. 7) that, during simultaneous processing of startup control of the engine Eng and downshift control of the automatic transmission AT during driving, executes first simultaneous process control in which startup control is first and downshift control is later; second simultaneous process control means (FIG. 8) that, during simultaneous processing of startup control of the engine Eng and downshift control of the automatic transmission AT during driving, executes second simultaneous process control in which downshift control is first and startup control is later; simultaneous process selection control means (FIG. 6) that, before and after initiating simultaneous processing, selects as the control either the first process control or the second process control, on the basis of a scenario determination as to whether sufficient motor torque for cranking can be ensured. Therefore, at times of simultaneous processing of engine startup control and downshift control during driving, satisfactory shock performance and lag performance can be achieved in any sort of scenario.

(2) The simultaneous process selection control means (FIG. 6) determines whether the scenario is one in which the motor revolution or motor torque subsequent to downshifting is less than a threshold value (Step S9), and when the motor revolution or motor torque is equal to or greater than the threshold value, selects the first process selection control (Step S11). Therefore, by selecting (Startup first→shift later) first simultaneous process control at the time of a scenario of a narrow motor torque operational range subsequent to termination of downshifting, shock due to inability to output the torque necessary for engine startup can be prevented.

(3) The simultaneous process selection control means (FIG. 6) determines whether the scenario is one in which the torque capacity of the shift release element at the time of an engine startup request is less than a threshold value (Step S10), and at times of an determination to the effect that the torque capacity of the shift release element is less than the threshold value, selects the second process selection control (Step S12). Therefore, by selecting (Shift first→startup later) second simultaneous process control at the time of a scenario in which drive force cannot be sufficiently transmitted, the driver can be prevented from feeling lag.

(4) The simultaneous process selection control means (FIG. 6) only selects the second process selection control (Step S12) in a case where the scenario is determined to be one in which the motor revolution or motor torque after downshifting is less than the threshold value (YES in Step S9), and moreover the torque capacity of the shift release element is less than a threshold value (YES in Step S10). Therefore, at the time of a scenario of a wide motor torque operational range subsequent to termination of downshifting, and in which drive force cannot be sufficiently transmitted, the driver can be prevented from feeling lag, through selection of the (Shift first→startup later) second simultaneous process control.

While the hybrid vehicle control device of the present invention has been described hereinabove on the basis of Example 1, the specific configuration is not limited to Example 1, and various modifications, additions, and the like, to the design are permissible without departing from the spirit of the invention according to the claims.

Example 1 showed an example in which the determination conditions for selecting the first simultaneous process control or the second simultaneous process control are a post-shift motor revolution condition subsequent to downshifting, and a release clutch torque capacity condition at the time of an engine startup request. However, examples involving modified conditions or other additional conditions, such as a post-shift motor torque condition or the like, in place of the post-shift motor revolution condition would also be acceptable. Moreover, in scenarios in which it is possible to select either the first simultaneous process control or the second simultaneous process control, an example involving determination of a driver-requested condition, for example, selecting the first simultaneous process control when fuel request is high, and selecting the second simultaneous process control when acceleration request is high, would also be acceptable.

Example 1 showed an example in which, after the post-shift motor revolution condition subsequent to downshifting has been met in Step S9 of FIG. 6, it is determined whether the release clutch torque capacity condition at the time of the engine startup request in Step S10 of FIG. 6 is met, selecting the second simultaneous process control when both conditions are met. However, an example in which determinations of the two conditions are reversed, i.e., after the release clutch torque capacity condition at the time of the engine startup request is met, it is determined whether the post-shift motor revolution condition subsequent to downshifting has been met, selecting the second simultaneous process control when both conditions are met. In this case, when either one of the two conditions is not met, the first simultaneous process control is selected, in the same manner as in Example 1.

Example 1 showed an example in which, during the second simultaneous process control, downshifting proceeds through revolution control by the motor/generator MG. However, an example involving downshifting proceeds by performing recharge hydraulic pressure control is also acceptable. Moreover, an example in which downshifting proceeds through a combination of recharge hydraulic pressure control and motor revolution speed control is also acceptable. That is, it is acceptable to terminate downshift control prior to termination of engine startup control (during cranking) during simultaneous process control.

Example 1 showed an example in which the frictional element subjected to slip control (the second clutch CL2) in the engine startup control range is selected from among a plurality of frictional elements internal to the automatic transmission AT, which is of dual clutch design. However, the invention would be fulfilled even in a case where a frictional element provided separately from the automatic transmission AT is selected as the second clutch CL2. Therefore, an example in which a frictional element provided separately from the automatic transmission AT, between the motor/generator MG and the transmission, for maintaining application during driving, is selected as the second clutch CL2 would also be acceptable. Moreover, an example in which a frictional element provided separately from the automatic transmission AT, between the transmission output shaft and the drive wheels, for maintaining application during driving, is selected as the second clutch CL2 would also be acceptable.

In Embodiment 1, an example was presented in which a multi-speed automatic transmission having seven forward speeds and one reverse speed is used as the automatic transmission. However, the number of shift positions is not limited as such, and the automatic transmission preferably has a plurality of shift positions as the shift positions. Furthermore, a belt-type continuously variable transmission, whereby the shift ratio is automatically varied without speed levels, may be used as the automatic transmission.

In Embodiment 1, an example was presented in which the present invention was applied to an FR hybrid vehicle comprising a one-motor two-clutch drive system. However, the present invention can also be applied to an FF hybrid vehicle comprising a one-motor two-clutch drive system.

The invention claimed is:

1. A hybrid vehicle control device comprising:
an engine;
a motor provided to a drive system from the engine to a drive wheel, and having a drive motor function as well as an engine startup motor function;
a first clutch for switching to a hybrid vehicle travel mode by engaging and an electric vehicle travel mode by disengaging, the first clutch being installed between the engine and the motor;
an automatic transmission for automatically varying a gear ratio, the automatic transmission being installed between the motor and the drive wheel;
a second clutch for maintaining a slip-engaged state during an engine startup control, that includes during cranking, the second clutch being installed in any position from the motor to the drive wheel; and
a controller including
a first simultaneous process control section programmed such that during a simultaneous processing of the engine startup control initiated on based a startup request and a downshift control of the automatic transmission initiated based on a shift request while traveling, the engine startup control is first executed, and then the downshift control is executed once the engine startup control is completed
a second simultaneous process control section programmed such that during simultaneous processing of the engine startup control initiated based on a startup request and the downshift control of the automatic transmission initiated based on a shift request while traveling, the engine startup control and the downshift control are executed in parallel, and prior to completion of startup of the engine, completes downshifting by engaging the engaged element that is engaged for the downshifting, the automatic transmission is placed into a state of transmitting drive force in a shift position occurring after the down shifting; and
a simultaneous process selection control section programmed such that before simultaneously processing the engine startup control and the downshift control, in cases where torque outputtable by the motor after downshifting is less than a predetermined torque for starting up the engine, the simultaneous process selection control section selects the first simultaneous process control, and cases where the torque outputtable by the motor subsequent to downshifting is equal to or greater than the predetermined torque for starting up the engine, the simultaneous process selection control section selects the second simultaneous process control, whereupon simultaneous processing of the engine startup control and the downshift control is executed by the simultaneous process control section accordingly.

2. The hybrid vehicle control device according to claim 1, wherein
the simultaneous process selection control section is programmed to determine whether a scenario is one in which motor speed subsequent to downshifting is less than a threshold value, and when the scenario is determined to be one in which the motor speed is equal to or greater than the threshold value, and sufficient motor torque be ensured, prohibits downshift control during engine speed increase control by the motor, and selects the first simultaneous process control to perform downshifting subsequent to completion of engine speed increase control.

3. The hybrid vehicle control device according to claim 1, wherein the simultaneous process selection control section is programmed to determine whether a scenario is one in which a torque capacity of a shift release element at the time of an engine startup request is less than a threshold value; and when the scenario is determined to be one in which the torque capacity of the shift release element released during downshifting is less than the threshold value when performing recharge shifting for release of one applied frictional element and for application of one released frictional element from among the frictional elements provided to the shift gear mechanism of the automatic transmission, and in which a value equivalent to the driver-requested drive power to be ensured during cranking is not satisfied, selects the second simultaneous process control for performing the engine speed increase control by the motor, and downshift control, in parallel.

4. The hybrid vehicle control device according to claim 3, wherein the simultaneous process selection control section is programmed to only select the second simultaneous process control in cases where a scenario is determined to be one in which the motor speed subsequent to downshifting is less than the threshold value, and the scenario is determined to be one in which the torque capacity of the shift release element released during downshifting is less than the threshold value when performing recharge shifting for release of one applied frictional element and for application of one released frictional element from among the frictional elements provided to the shift gear mechanism of the automatic transmission.

5. The hybrid vehicle control device according to claim 1, wherein the second simultaneous process control section, during simultaneous processing of the engine startup control and downshift control of the automatic transmission while traveling, is programmed to cause the first clutch to travel a stroke in an engaging direction and initiates the engine startup control before the downshifting is complete.

6. The hybrid vehicle control device according to claim 5, wherein the second simultaneous process control section, during the downshift control, is programmed to increase an input speed of the automatic transmission to a target input speed using motor torque, and to initiate control for engaging the engaged element which is engaged for the downshifting when the target input speed is reached.

* * * * *